US012093855B2

(12) United States Patent
Pachigar et al.

(10) Patent No.: US 12,093,855 B2
(45) Date of Patent: Sep. 17, 2024

(54) SYSTEMS AND METHODS FOR SERVICE LOCATION OPTIMIZATION

(71) Applicant: Mars, Incorporated, McLean, VA (US)

(72) Inventors: Asif Gulambhai Pachigar, Slough (GB); Anuj Sethi, Reading (GB); Matthew D. Scherzer, Maplewood, NJ (US); Michael Weinstock, Harrisburg, PA (US); Michael C. Pedi, Chicago, IL (US); Sumeet Pundlik, Bengaluru (IN); Kanika Goyal, Madhya Pradesh (IN); Debasis Panda, Odisha (IN); Suman Kumar Rana, Hyderabad (IN); Pranav Alva, New York, NY (US)

(73) Assignee: MARS, INCORPORATED, McLean, VA (US)

( * ) Notice: Subject to any disclaimer, the term of this patent is extended or adjusted under 35 U.S.C. 154(b) by 0 days.

(21) Appl. No.: 17/933,544

(22) Filed: Sep. 20, 2022

(65) Prior Publication Data
US 2023/0419201 A1 Dec. 28, 2023

(30) Foreign Application Priority Data

Jun. 27, 2022 (IN) .............................. 202211036805

(51) Int. Cl.
*G06Q 10/06* (2023.01)
*G06Q 10/063* (2023.01)
*H04W 64/00* (2009.01)

(52) U.S. Cl.
CPC ........ *G06Q 10/063* (2013.01); *H04W 64/003* (2013.01)

(58) Field of Classification Search
CPC .......................... G06Q 10/063; H04W 64/003
See application file for complete search history.

(56) References Cited

U.S. PATENT DOCUMENTS

| 8,712,855 | B1* | 4/2014 | Weigman | ............... G06Q 20/20 705/16 |
| 2014/0180848 | A1* | 6/2014 | Argue | ...................... G07G 1/01 705/16 |
| 2016/0379200 | A1* | 12/2016 | Phillips | .................. G06Q 20/20 705/17 |
| 2017/0083850 | A1* | 3/2017 | Crow | .................. G06F 16/2477 |
| 2018/0225615 | A1* | 8/2018 | Thomas | ............. G06Q 10/0633 |
| 2018/0232796 | A1 | 8/2018 | Glaser et al. | |

(Continued)

FOREIGN PATENT DOCUMENTS

JP 2015146083 A * 8/2015
KR 20140076793 A * 6/2014 ............. G06Q 20/20

OTHER PUBLICATIONS

Translation of KR 20140076793 A (Year: 2014).*

(Continued)

*Primary Examiner* — Mehmet Yesildag
*Assistant Examiner* — Jeremy L Gunn

(57) ABSTRACT

A method for service location optimization may include methods for deriving service location utilization data from video, predicting an operational characteristic of a service location, optimizing an operational characteristic of a service location, and presenting a user interface for user-directed optimization of an operational characteristic of a service location.

20 Claims, 15 Drawing Sheets

(56) References Cited

U.S. PATENT DOCUMENTS

| | | | |
|---|---|---|---|
| 2019/0104220 A1* | 4/2019 | Shimosato | G06F 3/1203 |
| 2019/0147708 A1* | 5/2019 | Monaco | G06Q 20/065 |
| | | | 705/16 |
| 2021/0241249 A1* | 8/2021 | DeBardlebon | G06V 20/52 |
| 2021/0279693 A1* | 9/2021 | Sekimoto | G06Q 40/03 |
| 2021/0097461 A1 | 10/2021 | Baughman et al. | |

OTHER PUBLICATIONS

English translation of JP 2015146083 A (Year: 2015).*
P. L. Venetianer, Z. Zhang, A. Scanlon, Y. Hu and A. J. Lipton, "Video verification of point of sale transactions," 2007 IEEE Conference on Advanced Video and Signal Based Surveillance, London, UK, 2007, pp. 411-416, doi: 10.1109/AVSS.2007.4425346 (Year: 2007).*
Antczak Tomasz et al: "Data-Driven Simulation Modeling of the Checkout Process in Supermarkets: Insights for Decision Support in Retail Operations", IEEE Access, IEEE, USA, vol. 8, Dec. 21, 2020 (Dec. 21, 2020), pp. 228841-228852, XP011827342, DOI: 10.1109/ACCESS.2020.3045919 [retrieved on Dec. 30, 2020].
European Search Report issued in European Application No. 230181582.0 dated Oct. 9, 2023 (19 pages).
Rajvanshi Aseem et al: "Queue Time Estimation in Checkout Counters Using Computer Vision and Deep Neural Network", Journal of Physics: Conference Series, vol. 1964, No. 6, Jul. 1, 2021 (Jul. 1, 2021), p. 062108, XP093008678, GB ISSN: 1742-6588, DOI: 10.1088/1742-6596/1964/6/062108 Retrieved from the Internet: URL:https://iopscience.iop.org/article/10.1088/1742-6596/1964/6/062108/pdf>.

* cited by examiner

SYSTEMS AND METHODS FOR SERVICE LOCATION OPTIMIZATION

CROSS-REFERENCE TO RELATED APPLICATION(S)

This application claims the benefit of priority to Indian Patent Application No. 202211036805, filed Jun. 27, 2022, the entirety of which is incorporated by reference herein.

TECHNICAL FIELD

Various embodiments of the present disclosure relate generally to the design and layout of retail service locations and, more particularly, to optimizing retail service location configurations.

BACKGROUND

Grocery stores and other retail service locations currently use of mix of manned ("full service" check-out) and unmanned ("self" check-out) point-of-sale (POS) terminals. Manned POS terminals may include traditional manned POS terminals, express manned POS terminals, or reversible manned POS terminals that may be converted to other types of POS terminal, such as express or self-service. Current POS equipment configurations in many retail service locations can be inefficient with respect to servicing customers waiting to check out with their purchases. That is, the number and mixture of POS terminals at a service location may not be well matched to the arrival rate of customers and the number of items in the customers' baskets. This inefficiency may be the result of the number of manned and unmanned POS terminals present at the location, and the number of those POS terminals that are operational at a given time during the business day. Furthermore, an efficient number and mixture of POS terminals at a service location may vary depending on the time of day, day of the week, and other factors, such as holidays, special events, and retailer or manufacturer promotions, etc. The result of such inefficient allocations of POS terminals is reduced customer throughput, speed, excess capital expenditure on unneeded POS terminals, and excess merchandise at largely unused POS terminals. These inefficiencies may result in customer dissatisfaction, increased overhead for the merchant, decreased sales for the merchant, and an overall reduction in profit margin for the merchant.

The present disclosure is directed to overcoming one or more of these above-referenced challenges.

SUMMARY OF THE DISCLOSURE

According to certain aspects of the present disclosure, systems and methods are disclosed for service location optimization.

In one embodiment, a computer-implemented method is disclosed for deriving service location utilization data from video in a method for service location optimization, the method comprising: receiving one or more streams of video data from one or more imaging devices located in a retail service location, uniquely identifying, within the one or more streams of video data, one or more customers of the retail service location, determining, for each uniquely identified customer of the retail service location, one or more metrics of utilization of the retail service location, and aggregating each of the one or more metrics determined for each uniquely identified customer of the retail service location as one or more total metrics of utilization of the retail service location.

In one embodiment, a computer-implemented method is disclosed for predicting an operational characteristic of a service location in a method for service location optimization, the method comprising: receiving settings for one or more specified operational characteristics of a service location, deriving a derived operational characteristic of the service location based on the one or more specified operational characteristics by calculating a wait time associated with each of at least one manned service lane and at least one unmanned service lane using video data collected from the service location, and reporting the derived another operational characteristic of the service location to the user.

In one embodiment, a computer-implemented method is disclosed for optimizing an operational characteristic of a service location in a method for service location optimization, the method comprising: receiving data for one or more operational characteristics for one or more reference service locations, receiving, from a user, a target value for an additional operational characteristic of a target service location, receiving data for one or more operational point of sale (POS) terminals for the target service location and/or from the reference service locations, calculating a predicted service rate based on the received operation characteristics and the received data for the operational POS terminals, calculating an average value of the additional operational characteristic for each of the operational POS terminals, selecting a POS terminal among the one or more operational POS terminals with a calculated average value of the additional operational characteristic that matches the target value for the additional operational characteristic as a representative POS terminal, and determining operational characteristics of a target POS terminal of the target service location as the operational characteristics of the representative POS terminal.

In one embodiment, a computer-implemented method is disclosed for presenting a user interface for user-directed optimization of an operational characteristic of a service location in a method for service location optimization, the method comprising: displaying an user selection user interface allowing a user to select an operational characteristic of a service location for optimization and allowing the user to specify one or more parameters controlling the optimization based deriving a derived operational characteristic of the service location based on the one or more specified operational parameters with respect to each of at least one manned service lane and at least one unmanned service lane using video data collected from the service location, and displaying a results user interface displaying a result of the optimization, the results user interface comprising a result summary and a results detail.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to optimizing retail service location configurations.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

As discussed above, the number and mixture of POS terminals at a service location may not be well matched to the arrival rate of customers and the number of items in the customers' baskets. One or more embodiments may address such inefficiencies through an optimization of the number, mixture, and operation schedule of the POS terminals at a service location. This may be accomplished through measurement and monitoring of the operational characteristics of the service location, including, for example, customer arrival rate, the items selected by each customer, customer wait time and service time at the POS terminals, etc. These characteristics may be measured through an analysis of video data, data provided by other sensors, and data provided by the POS terminals. The operator of the service location may then obtain performance metrics for the service location, models and predictions of key characteristics of the service location based on user-selected criteria, and suggested optimizations of the POS terminal configuration and operation based on user-selected criteria.

Figure 1:
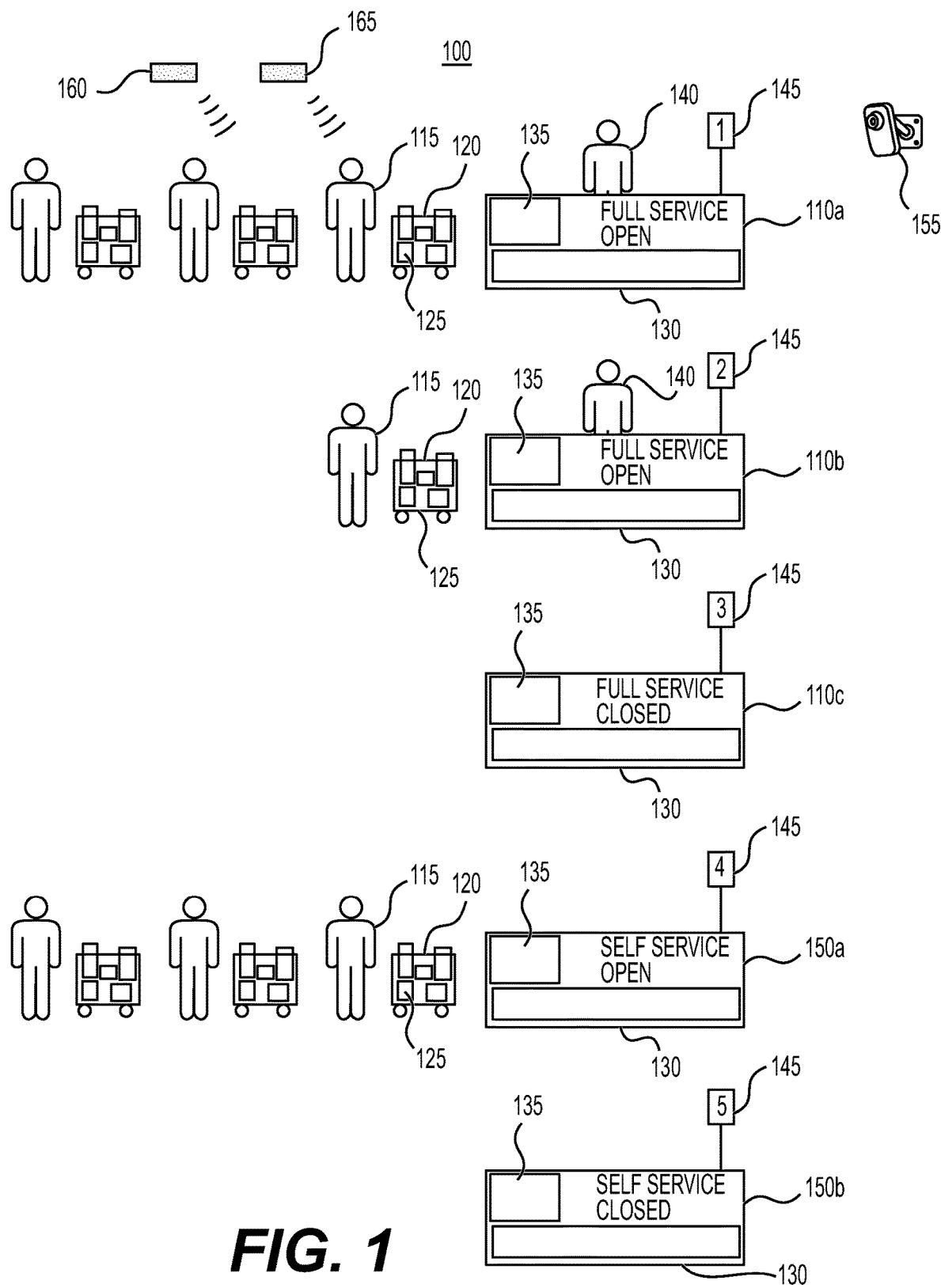
FIG. 1 depicts an exemplary overview of a retail service location, as in a method for service location optimization, according to one or more embodiments.
Figure 2:
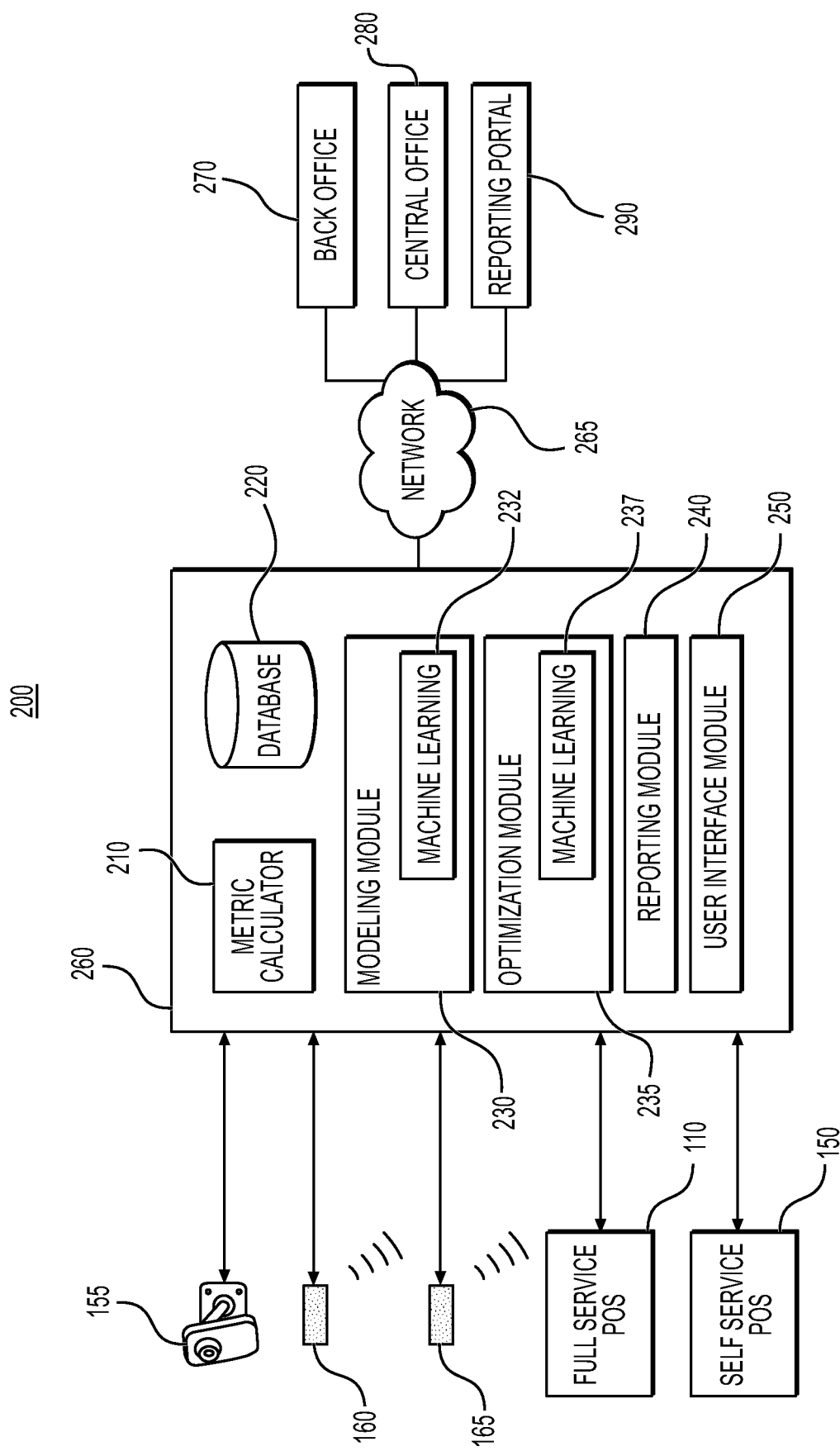
FIG. 2 depicts an exemplary system infrastructure for service location optimization, according to one or more embodiments.
Figure 13:
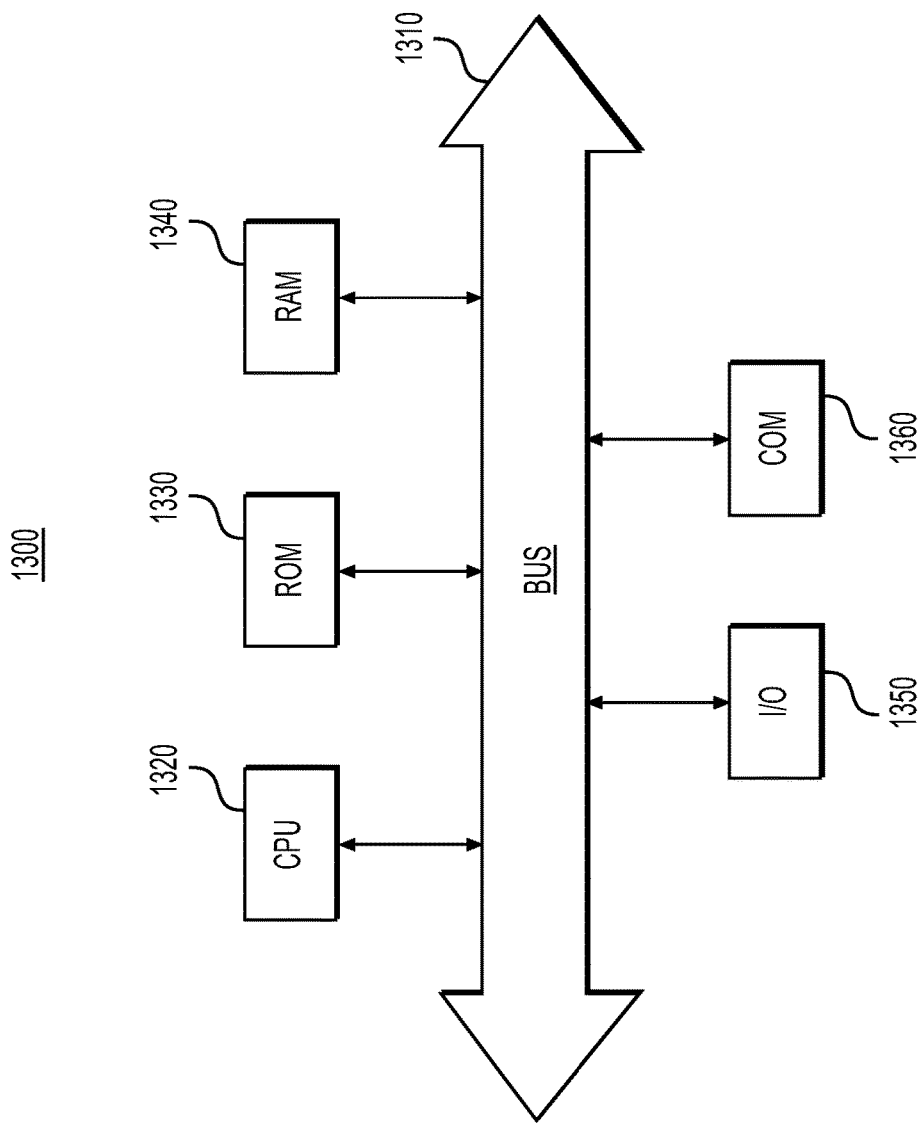
FIG. 13 depicts a simplified functional block diagram of a computer that may be configured as a device for executing a method of service location optimization, according to one or more embodiments.

Any suitable system infrastructure may be put into place for optimizing retail service location configurations. FIGS. 1, 2 and 13, and the following discussion, provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1, 2 and 13. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

Retail Service Location

FIG. 1 depicts an exemplary overview of a retail service location 100 for which techniques are disclosed for service location optimization, according to one or more embodiments. As shown in FIG. 1, retail service location 100 may include number of manned, or "full service," point of sale (POS) terminals 110, such as manned POS terminals 110a-110c shown in FIG. 1. Retail service location 100 may further include number of unmanned, or "self service," POS terminals 150, such as unmanned POS terminals 150a-150b shown in FIG. 1. Each manned POS terminal 110 may be a traditional manned or "full-service" POS terminal, express manned POS terminal, or reversible manned POS terminal that may be converted to other types of POS terminals, such as express or self-service. Unmanned POS terminals 150 may be provided individually, each with a separate entry and queue, or may be provided together, such as in a "bullpen" with a single entry and queue. Each of the POS terminals 110 and 150 may be operational (i.e., "open") or not operational (i.e., "closed"). Manned POS terminals 110 may likewise be provided with a separate queue for each POS terminal 110 or may be provided with a single queue for multiple POS terminals 110. Each of the POS terminals 110 and 150 may include an indicia 145 presenting information about POS terminals 110 and 150, such as, for example, a lane identifier and/or an operation status of POS terminals 110 and 150. The operational status of POS terminals 110 and 150, may be, for example, "open," "closed," "ready for next customer," "customer needs assistance," "equipment service required," etc. Each of the POS terminals 110 and 150 may further include, for example, a POS system 135, a fixture 130, such as, for example, a stand, counter, or table, on which items to be purchased may be presented by a customer. The configuration of each POS terminal 110 and 150, such as to include scanners, conveyor belts, payment PIN pads, currency acceptors and dispensers, displays, etc., may be according to any suitable configuration as would be understood by one or ordinary skill. In addition, a manned POS terminal 110 that is in an "open" operational status may be operated by a clerk or cashier 140.

Each operational POS terminal 110 and 150 may have a queue of customers 115 waiting to complete their purchases. Each customer 115 may have with them a number of items 125 to be purchased, such as may be carried in their hands, and/or in a basket or cart 120.

Activity within retail service location 100, such as customer 115 arrivals, customers 115 waiting in a queue at each POS terminal 110 or 150, customer wait time at each POS terminal 110 or 150, an average service time at each POS terminal 110 or 150, a number or mixture of items 125 to be purchased for each customer 115, etc., may be detected and measured by various sensors positioned within retail service location 100. For example, retail service location 100 may be outfitted with one or more video cameras 155, one or more motion detectors 160, one or more sensors 165 to detect identifying tags affixed to items 125 such as by radio frequency identification (RFID), etc. For example, the presence and movement of customers 115 may be determined using video cameras 155 and/or motion detectors 160. A number or mixture of items 125 in the customer's basket or cart 120 may be determined, for example, by optical recognition via video cameras 155 and/or by sensors 165 remotely reading identifying tags attached to items 125 as customer 115 moves about retail service location 100 or during the check-out procedure as items 125 are processed at POS system 135. Alternatively, real-time object recognition in images captured by video cameras 155 may identify items 125 selected by customer 115 and placed in basket or cart 120.

Determining operational characteristics of retail service location 100 may include, for example, receiving one or more streams of video data from one or more imaging devices located in a retail service location, uniquely identifying, within the one or more streams of video data, one or more customers of the retail service location, determining, for each uniquely identified customer of the retail service location, one or more metrics of utilization of the retail service location, and aggregating each of the one or more metrics determined for each uniquely identified customer of the retail service location as one or more total metrics of utilization of the retail service location.

Aggregate retail service location 100 data, including, for example, a number of POS terminals 110 or 150 by type (manned unmanned), retail service location 100 traffic, and retail service location 100 sales volume, etc., may be determined at any desired frequency (hourly, daily, weekly, etc.) over any desired present or past time period (current day, week, year, etc. to date, most recent day, week, year, etc., selected day, week, year, etc. in the past, and so on).

Modeling of Retail Service Location Operations

The owner or operator of retail service location 100 may wish to better understand the operations of retail service location 100 in order to, for example, optimize the area of POS terminals 110 and 150, i.e., the "front end" of retail service location 100, such as through more efficient scheduling or operation of existing POS terminals 110 and 150 or through an improved design of the retail service location 100 front end, and to model a return on investment (ROI) of retail service location 100 with respect to labor cost, operating hours, floor space utilization, etc.

Such an improved understanding of the operations of retail service location 100 may be gained through an application of modern statistical modeling approaches, such as queue theory modeling. For example, the owner or operator of retail service location 100 may better understand the service level of retail service location 100 by type of POS terminals 110 and 150 based on a measured, calculated, modeled, or predicted average waiting time and average service time. The performance of retail service location 100 may be measured on any suitable time scale, such as a number of minutes, each hour, day, or day-part, and may include peak versus non-peak times of day, weekend versus weekday, holidays versus normal days, days of particular advertising promotions, etc. Such analysis may not only indicate potential performance gains for a particular retail service location 100, but may proactively identify retail service locations 100 that may benefit from such an analysis.

Data used as input to these statistical methods may include, for example, information by type of POS terminals 110 and 150, such as, for example, unmanned or "self-service" POS terminals, traditional manned or "full-service" POS terminals, express manned POS terminals, or reversible manned POS terminals that may be converted to other types of POS terminal, such as express of self-service. Data may be collected over any appropriate time frame such as, for example, a full year (365 days), and may cover a full day or any portion of the operating hours of retail service location 100 (e.g., 6:00 AM to 11:59 PM). The gathered data may include, for example, customer arrivals per hour, a number of transactions per hour, a number of items per transaction, a total amount spent per basket ("basket size"), hourly traffic in store, etc.

Sample data for four retail service locations 100 is shown below in Table 1.

TABLE 1

| Service Location | 6243 | | 6282 | | 6314 | | 6319 | |
|---|---|---|---|---|---|---|---|---|
| $Sales (MM) | 32.5 | | 42.2 | | 35.9 | | 27.8 | |
| Manned - Express | 5.9 (18%) | 4 | 0 (0%) | 0 | 5.9 (16%) | 3 | 1.7 (6%) | 2 |
| Manned - Traditional | 15.8 (49%) | 5 | 16.8 (40%) | 4 | 20.3 (57%) | 5 | 17.7 (64%) | 5 |
| Reversible | 0 (0%) | 0 | 15.9 (38%) | 7 | 0 (0%) | 0 | 0 (0%) | 0 |
| Self-Service | 10.8 (33%) | 8 | 9.5 (22%) | 6 | 9.7 (27%) | 6 | 8.4 (30%) | 6 |
| Store Traffic (MM) | 1.2 | | 1.4 | | 1.3 | | 1 | |
| Shoppers (MM) | 0.7 | | 0.9 | | 0.7 | | 0.6 | |
| $ per Shopper | 46 | | 47 | | 52 | | 49 | |

The data collected for retail service location 100 may yield insights into, for example, customer wait time and average service time at POS terminals 110 and 150 depending on the type of POS terminal. For example, as shown in Table 2, traditional manned POS terminals 110 may have a longer wait time, but a shorter service time, than unmanned POS terminals 150.

TABLE 2

| Time in Seconds | Wait Time | Service Time | Total Time |
|---|---|---|---|
| Manned - Express | 3.4 | 2.3 | 5.7 |
| Manned - Traditional | 2.7 | 2.1 | 4.8 |
| Reversible | 2.8 | 2.2 | 5.0 |
| Self-Service | 0.1 | 2.7 | 2.8 |

Insights such as these may be further explored using statistical and modeling techniques, such as, for example, queue theory modeling, as discussed in greater detail below.

Queue theory modelling may be used to understand and design workflows for multiple retail service locations 100. This may include using a mathematical approach to capture, define, and optimize, for example, a relationship between "Service time" and "Items in basket." Such a relationship may be used to generate and display desired metrics, such as "Service rate capacity" and recommended store/location configurations, such as the optimized number and mix of manned vs. unmanned service lanes. Such analysis may lead to a better understanding of the operation of a retail service locations 100, and may be used to suggest improved configurations and operations of retail service locations 100.

Such an application of queue theory modelling may include calculation of a "service-rate capacity" (SRC) at each type of POS terminal 110 or 150 by capturing a relationship between a "Service Time" and a number of items in a basket 120 of customer 115. Queue theory modelling may take one or more inputs in terms of a number of POS terminals 110 or 150 in operation, an arrival rate (i.e., a number of customer 115 joining a queue at a POS terminal 110 or 150) and the SRC. Queue theory modelling may yield, as an output, a number of customers 115 waiting in the queue, a wait time of customers 115 waiting in the queue, probability of a particular number of customers 115 waiting in the queue, a probability of a wait time of customers 115 exceeding a specific threshold (30 seconds, 1 minute, 2 minutes, 5 minutes, etc.), and so on.

Generalized queue theory modelling may be based, for example, on these formulas:

$\lambda$ is the mean arrival rate of customers 115 at retail service location 100. That is, the average number of customers 115 that arrive at retail service location 100 per unit of time.

$\mu$ is the mean service rate. That is, the average number of customers 115 that can be served per unit of time.

The average utilization of a system, such as POS terminals 110 and 150, is $\rho = \lambda/\mu$.

The average number of customers 115 in the system, that is, in retail service location 100, is $L = \lambda/(\mu - \lambda)$.

The average number of customers 115 waiting in line, that is, in the queues of POS terminals 110 and 150, is $L_Q = \rho L$.

The average time a customer 115 spends in retail service location 100, including service time at a POS terminals 110 and 150 is $W = 1/(\mu - \lambda)$.

The average time customer 115 spends waiting line, that is, in the queues of POS terminals 110 and 150, is $W_Q = \rho W$.

The probability that $n$ customers are 115 are in retail service location 100 at a given time is $P_n = (1 - \rho)\rho^n$.

In addition, these formulas may be used in the calculation optimizations of retail service location 100, such as by optimization module 235 depicted in FIG. 2:

Average number of customer waiting in queue($N_q$)= ($\rho/(1-\rho))/(1+Q)$,where $\rho=r/$(operational percentage of POS terminals 110 and 150) and $r=(\lambda)/$ (service rate capacity).

Average waiting time in a queue($T_q$)=($N_q/\lambda$)*60.

Average utilization of POS terminals 110 and 150= (($\lambda$)/((service rate capacity)*(operational percentage of POS terminals 110 and 150)))*100.

Operational POS terminals 110 and 150=Total POS terminals 110 and 150*Operational Percentage of POS terminals 110 and 150.

This analysis may yield insights, such as, for example, an additive interaction of varying arrival rate of customers 115 and varying transaction size, a predictability of this variation by daypart and day of week, and how it may impact a wait time of customers 115 waiting in the queue, and a predictable variation in transaction process speed between manned POS terminals 110 and unmanned POS terminals 150. For example, as discussed above with respect to Table 2, manned POS terminals 110 may consistently process transactions of the same size faster than unmanned POS terminals 150. These insights may allow for managed utilization and wait time at various POS terminals 110 or 150, determination of which type of POS terminal 110 or 150 may be best for optimal utilization, planning of service level by POS terminals 110 or 150 for peak vs. non-peak times of day, weekend vs. weekday, holidays vs. normal days, etc.

In addition, this analysis may provide insights into a relationship between a number of items 125 in basket or cart 120 of customer 115, and the choice between a manned POS terminal 110 versus an unmanned POS terminal 150 by customer 115. For example, customers 115 with fewer items 125 in basket or cart 120 may be more likely to choose an unmanned POS terminal 150 while those with larger number of items in basket or cart 120 may be more likely to choose a manned POS terminal. Further, this analysis may provide insights into how a total number of transactions per hour in a retail service location 100 and the varying number of items 125 in basket or cart 120 of customer 115 may be likely to skew customers 115 with basket sizes on the margins to choose either a manned POS terminal 110 or an unmanned POS terminal 150.

Insights into an arrival rate of customers 115 and varying transaction size, a wait time of customers 115 waiting in a queue, and the choice of a manned POS terminal 110 or an unmanned POS terminal 150 by customer 115 may allow for a simulation of a probability of the number of customers 115 waiting and the total wait time in the queue.

Based on these insights and simulations, one or more predictions about the operation of retail service location 100 may be performed. For example, a number and type of manned POS terminals 110 or unmanned POS terminals 150 needed to meet customer service requirements may be predicted. Such a prediction may allow the operator of retail service location 100 to design the checkout experience of customers 115 around the wait time of customers 115, possibly managing service time at retail service location 100 and more efficiently allocating capital expense on manned POS terminals 110 and unmanned POS terminals 150. In addition, such predictions may allow the operator of retail service location 100 to plan labor hours for clerks or cashiers 140 required by day-part and day of week to successfully meet customer service requirements.

Predicting an operational characteristic of retail service location 100 may include, for example, receiving settings for one or more specified operational characteristics of retail service location 100, deriving another operational characteristic of the service location based on the one or more specified operational characteristics, and reporting the derived another operational characteristic of the service location to the user. The specified operational characteristics may be received either from a user by way of a user interface, or from a database, such as database 200, of past operational characteristics of retail service location 100 and/or additional retail service locations 100. The operational characteristics of retail service location 100 may include, for example, one or more of a number of manned point of sale (POS) terminals present at the service location, a number unmanned POS terminals present at the service location, a schedule of operation of the manned POS terminals and the unmanned POS terminals, an arrival rate of customers at the service location, and an average number of service items selected by the customers at the service location.

Through these techniques, the transaction zone, the area of the retail service location 100 where purchase transactions are completed, may be more efficiently designed for better customer service, more efficient capital allocation for the purchase of POS equipment, reduced inventory days-on-hand and reduced margin loss due to aging product located at largely unused POS terminals.

FIGS. 2-13 and the discussion below describe a technical environment and related methods by which such an application of queue theory modelling may be accomplished.

Retail Service Location Optimizer

FIG. 2 depicts an exemplary system infrastructure for service location optimization, according to one or more embodiments. As shown in FIG. 2, a system for service location optimization may be employed in retail service location 100 as depicted in FIG. 1. Specifically, as shown in FIG. 1, retail service location 100 may include one or more manned POS terminals 110, also referred to a "full service" checkouts, one or more unmanned POS terminals 150, also referred to a "self" checkouts, and various sensors positioned within retail service location 100 such as, for example, one or more video cameras 155, one or more motion detectors 160, one or more radio frequency identification (RFID) sensors 165, etc. Data from POS terminals 110 and 150, and from the various sensors, may be provided to service location optimizer 260. It should be appreciated that while service location optimizer 260 is shown in communication with cameras 155, sensors 160, 165, POSs 110, 150, service location optimizer 260 may be executed either on-site at a service location, or receive data from those devices over any network, such as the Internet. Either way, service location optimizer 260 may be configured to receive input data whether locally or via network so as to perform various measurements, modelling, predictions, and optimizations of retail service location 100 operations as discussed above. These functions will be described in greater detail below with respect to FIGS. 3-12.

Service location optimizer 260 may generate metrics, predictions, models, and recommended optimizations of retail service location 100, and may include, for example, service location metric calculator 210, database 220, prediction modeling module 230, optimization module 235, reporting module 240, and user interface module 250.

Service location metric calculator 210 may use information received from POS terminals 110 and 150, and from the various sensors, to calculate various metrics of retail service location 100 including, for example, customer 115 arrivals per time period (minute, hour, day-part, day, etc.), total number of transactions per time period (minute, hour, day-part, day, etc., aggregated for all of retail service location 100, per each POS terminal 110 or 150, per type of POS terminal 110 or 150, etc.), average number of items per transaction (per minute, hour, day-part, day, etc., aggregated for all of retail service location 100, per each POS terminal 110 or 150, per type of POS terminal 110 or 150, etc.), average basket size per customer 115 (such as total amount spent, per minute, hour, day-part, day, etc., aggregated for all of retail service location 100, per each POS terminal 110 or 150, per type of POS terminal 110 or 150, etc.), customer traffic in retail service location 100 per time period (minute, hour, day-part, day, etc.), average number and percentage of POS terminals 110 and 150 in operation per time period (per minute, hour, day-part, day, etc., aggregated for all of retail service location 100, per each POS terminal 110 or 150, per type of POS terminal 110 or 150, etc.), distribution of all transactions by POS terminal type (per minute, hour, day-part, day, etc., per type of POS terminal 110 or 150), percentage of total spent by all customers 115 by POS terminal type (per minute, hour, day-part, day, etc., per type of POS terminal 110 or 150), etc.

In addition, service location metric calculator 210 may use information received from the various sensors, to measure customer 115 movements within retail service location 100 including, for example, entering a queue of a POS terminal 110 or 150, switching between queues of POS terminals 110 or 150, abandoning a queue of a POS terminal 110 or 150, time spent in a queue of a POS terminal 110 or 150, departure from retail service location 100 without entering a queue of a POS terminal 110 or 150, etc. These measurements may be combined with information received from POS terminals 110 and 150 to categorize these movements by, for example, the total number of items 125 in basket 120, a total amount spent on the items 125 in basket 120.

The information received from POS terminals 110 and 150, and from the various sensors, as well as the metrics calculated by service location metric calculator 210 may be stored in database 220. Database 220 may store data related to a particular retail service location 100 and/or for multiple retail service locations 100.

Prediction modeling module 230 may use the measurements and metrics produced by service location metric calculator 210 to model and then predict one or more metrics of retail service location 100, such as those discussed above, based on actual measured past metrics of retail service location 100, or of other of retail service locations 100, such as may be stored in database 220, and user-supplied settings for one or more operational characteristics of retail service location 100. The user-supplied settings for one or more operational characteristics may include, for example, a total number of transactions, a number of manned POS terminals 110 present at retail service location 100, a number unmanned POS terminals 150 present, a schedule of POS terminals 110 and 150 that are in operation according to time of day, day of the week, and other factors, such as holidays, special events, and retailer or manufacturer promotions, etc. The user-supplied settings may further include customer characteristics, including, for example, an arrival rate of customers 115, an average number of items 125 in each basket 120, an average total amount spent on the items 125 in each basket 120, etc. The customer characteristics may be specified according to time of day, day of the week, and other factors, such as holidays, special events, and retailer or manufacturer promotions, etc. Alternatively, these settings may be derived automatically based on past performance of retail service location 100, or of other of retail service locations 100, such as may be stored in database 220.

Prediction modeling module 230 may produce the predicted metrics by any suitable means, including, for example, queue theory, machine learning, such as by machine learning module 232, statistical analysis, artificial intelligence or any suitable combination.

Optimization module 235 may use the measurements and metrics produced by service location metric calculator 210 to generate recommended operational characteristics of retail service location 100 to optimize one or more metrics of retail service location 100, such as those discussed above. The recommended operational characteristics may include, for example, labor cost, a number of manned POS terminals 110 present at retail service location 100, a number unmanned POS terminals 150 present, a schedule of POS terminals 110 and 150 that are in operation according to time of day, day of the week, and other factors, such as holidays, special events, and retailer or manufacturer promotions, etc.

Optimization module 235 may produce the recommended operational characteristics of retail service location 100 by any suitable means, including, for example, queue theory, machine learning, such as by machine learning module 237, statistical analysis, artificial intelligence, or any suitable combination.

Reporting module 240 may produce reports, such as textual reports or graphical reports, presenting the metrics, predictions, models, and recommended optimizations of retail service location 100 generated by location optimizer, service location metric calculator 210, database 220, prediction module 230, or optimization module 235.

User interface module 250 may generate and present to a user, interactive graphical user interfaces including the metrics, predictions, models, and recommended optimizations of retail service location 100 generated by location optimizer, service location metric calculator 210, prediction module 230, or optimization module 235, as well as interactive graphical user interfaces to receive user input such as, for example, user-supplied settings for one or more operational characteristics of retail service location 100.

Service location optimizer 260 may be connected to other devices or servers in other locations by way of computer network 265, which may be any suitable type of computer network, such as a local area network, wide area network, wireless network, the Internet, etc. For example, service location optimizer 260 may transmit data including the metrics, predictions, models, and recommended optimizations of retail service location 100 generated by location optimizer, service location metric calculator 210, prediction module 230, or optimization module 235 to a central office 270, at which planning and control for multiple retail service locations 100 may be performed, or to a back office 280 specific to the particular retail service location 100, at which planning and control for the particular retail service location 100 may be performed. In addition, such information may be provided to any network-connected device, such as to a mobile device application, by way of a reporting portal 290.

Machine Learning

As discussed in further detail below, service location optimizer 260 may one or more of (i) generate, store, train, or use a machine-learning model configured to generate recommended optimizations of retail service location 100.

Service location optimizer 260 may include a machine-learning model and/or instructions associated with the machine-learning model, e.g., instructions for generating a machine-learning model, training the machine-learning model, using the machine-learning model etc. For example, these functions may be provided by machine learning module 232 of modeling module 230 or machine learning module 237 of optimization module 235, as depicted in FIG. 2. Service location optimizer 260 may include functions for retrieving data related to the operation of one or more retail service locations 100, analyzing such data, e.g., to model and then predict one or more metrics of retail service location 100 or to generate recommended operational characteristics of retail service location 100 to optimize one or more metrics of retail service location 100 based on the output of the machine-learning model, and/or generate one or more reports or user interfaces to display the generated models, predictions, or recommendations, e.g., as generated based on the machine-learning model. Service location optimizer 260 may include training data and ground truth or validation data. For example, service location optimizer 260 may employ recorded data for one or more retail service locations 100, such as may be stored in database 220 to train the one or more machine learning models. A portion of the data, e.g., 70%, may be used as training data and the remainder, e.g., 30%, may be used as validation data.

In some embodiments, a system or device other than service location optimizer 260 may be used to generate and/or train the machine-learning model. For example, such a system may include instructions for generating the machine-learning model, the training data and ground truth, and/or instructions for training the machine-learning model. A resulting trained-machine-learning model may then be provided to service location optimizer 260.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn associations between training data and ground truth data, such that the trained machine-learning model is configured to determine output generated models, predictions, or recommendations, e.g., as generated based on the machine-learning model in response to the input recorded data for one or more retail service locations 100 based on the learned associations.

In some instances, different samples of training data and/or input data may not be independent. For example, a dataset of past performance data for one or more retail service locations 100, such as may be stored in database 220, may include data samples for multiple distinct periods of time for each retail service location 100. Thus, in some embodiments, the machine-learning model may be configured to account for and/or determine relationships between multiple samples.

For example, in some embodiments, the machine-learning model of machine learning module 232 of modeling module 230 or machine learning module 237 of optimization module 235, as depicted in FIG. 2, may include a Recurrent Neural Network ("RNN"). Generally, RNNs are a class of feed-forward neural networks that may be well adapted to processing a sequence of inputs. In some embodiments, the machine-learning model may include a Long Shor Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of non-optical in vivo images as input, and generate a sequence of locations, e.g., a path, in the medical imaging data as output.

Further aspects of one or more machine-learning models and/or how they may be utilized to optimize the configuration and operation of retail service location 100 are discussed in further detail in the methods below. In the following methods, various acts may be described as performed or executed by a component from FIG. 2, such as service location optimizer 260, or components thereof. However, it should be understood that in various embodiments, various components of the environment 200 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Retail Service Location Modeling

Figure 3:
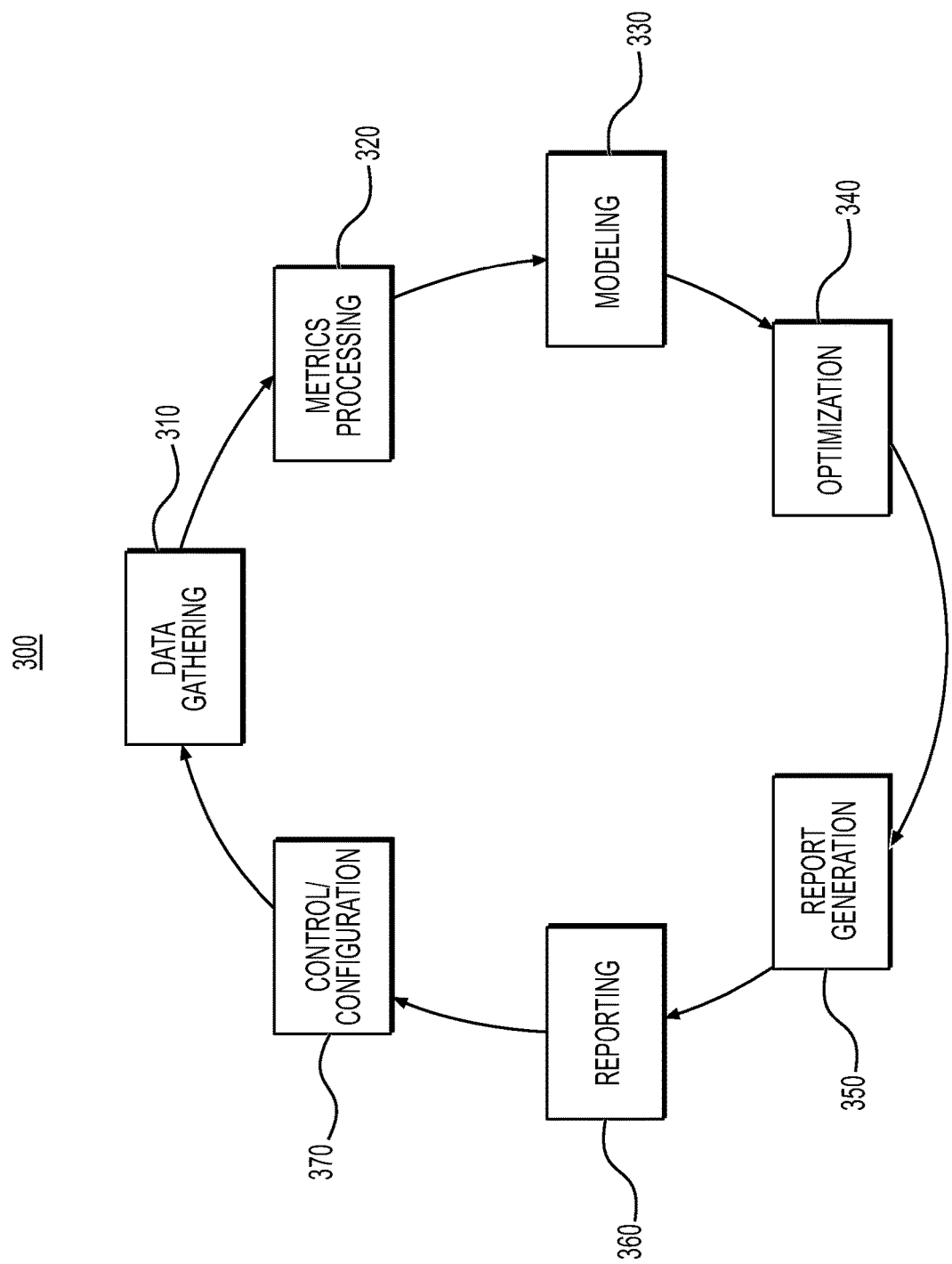
FIG. 3 depicts a process flow of a method of service location optimization, according to one or more embodiments.

The metrics, predictions, models, and recommended optimizations of retail service location 100 generated by service location optimizer 260 may be part of a cyclical or "closed-loop" feedback process of iterating and optimizing the configuration and operation of retail service location 100. FIG. 3 depicts a process flow of such a method of service location optimization, according to one or more embodiments.

As shown in FIG. 3, a cyclical process of iterating and optimizing the configuration and operation of retail service location 100 may include, for example, data gathering operations 310, metrics processing operations 320, modeling operations 330, optimization operations 340, report generation operations 350, reporting operations 360, and control and configuration operations 370. After control and configuration operations 370 have been completed, such as to apply an optimized configuration and/or operations to retail service location 100, the process may return to data gathering operations 310 and the process may be repeated to ensure continues optimal operation of retail service location 100. In some cases, control and configuration operations 370 may be accompanied by or even replaced by organic changes in conditions at the service location (e.g., even when a control or configuration has not changed, changes in conditions may cause new data to be gathered for updating the model and optimization).

Data gathering operations 310 may include, for example, gathering data from information received from POS terminals 110 and 150, and from the various sensors present at retail service location 100 or at other retail service locations 100. The gathered data may be stored, for example, in a database, such as database 220 depicted in FIG. 2.

Metrics processing operations 320 may include, for example, calculating various metrics of retail service location 100 using, for example, information received from POS terminals 110 and 150, and from the various sensors, or other data stored, for example, in database 220, as discussed above with respect to service location metric calculator 210. The generated metrics may be stored, for example, in database 220.

Modeling operations 330 may include generating various models of the operation of retail service location 100, as discussed above with respect to modeling module 230.

Optimization operations 340 may include, for example, use of measurements and metrics of retail service location 100 to generate recommended operational characteristics of retail service location 100 to optimize one or more metrics of retail service location 100, as discussed above with respect to optimization module 235.

Report generation operations 350 and Reporting operations 360 may include, for example, production of reports, such as textual reports or graphical reports, presenting the metrics, predictions, models, and recommended optimizations of retail service location 100, as discussed above with respect to reporting module 240, and delivery of the generated reports to various business operations and users, such as, for example, central office 270, back office 280, or by way of a reporting portal 290, as discussed above with respect to FIG. 2.

Control and configuration operations 370 may include, for example, determining a schedule of operations of POS terminals 110 and 150, determining additional POS terminals 110 and 150 to add to retail service location 100, determining one or more POS terminals 110 and 150 of retail service location 100 to be converted from manned POS terminals 110 to unmanned POS terminals 150 or vice versa, determining one or more POS terminals 110 and 150 of retail service location 100 to be removed, etc.

After control and configuration operations 370 have been completed, such as to apply an optimized configuration and/or operations to retail service location 100, the process may return to data gathering operations 310 and the process may be repeated to ensure continues optimal operation of retail service location 100.

Prediction and Modeling Operations

As discussed above, a process for optimizing the configuration and operation of retail service location 100, such as may be implemented by service location optimizer 260, may include generation of various metrics, metrics predictions, and models with respect to the operation of retail service location 100. These may include, for example, a clustering model, an arrival rate model, a service rate model, a traffic redistribution algorithm, an algorithm of determining operational POS terminals 110 and 150, and one or more optimization algorithms. The various metrics, metrics predictions, and models with respect to the operation of retail service location 100 may be derived based on data collected and stored with respect to retail service location 100, other retail service locations 100, or combinations thereof.

A clustering model may make use of hourly and store-level metrics to place retail service location 100 in one of several clusters of similar retail service locations 100 based on the configurations and performance of the retail service locations 100. Such clustering may be useful, for example, in comparing a retail service location 100 with other similar retail service locations 100. For example, the clustering model may be used to segregate a number of sample service locations into different categories (e.g., low volume and high-volume sales etc.). Table 3 below depicts an exemplary clustering of sample retail locations.

TABLE 3

| Cluster | Maximum avg. weekly sales | Minimum avg. Weekly sales | Cluster Type | Urban Volume | Cluster Group |
| --- | --- | --- | --- | --- | --- |
| 1 | $ 237,882 | $ 148,203 | Low Volume | High Rural | Low Volume |
| 2 | $ 520,405 | $ 393,402 | Medium Volume | High Urban | Med Vol - High Urban |
| 3 | $ 890,428 | $ 583,033 | High Volume | High Urban | High Vol |
| 4 | $ 380,937 | $ 258,853 | Medium Volume | High Urban | Med Vol - Low Urban |

Figure 4:
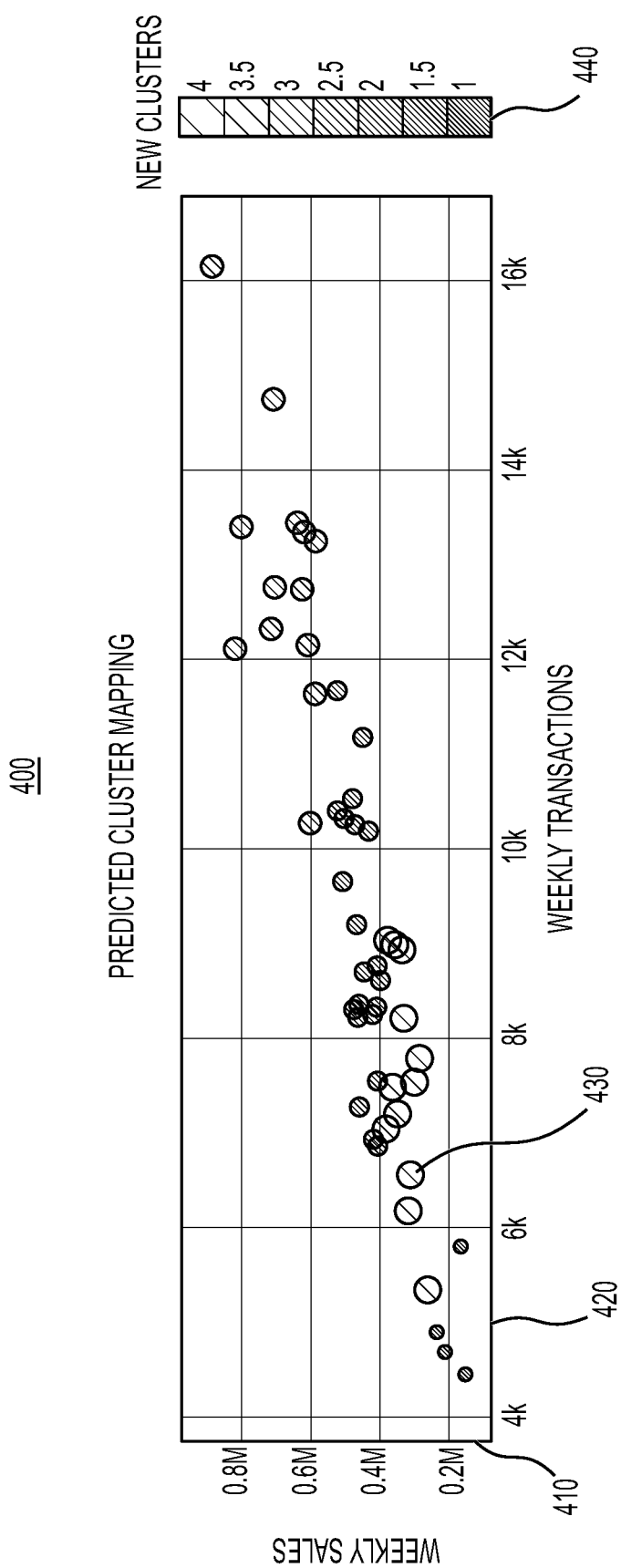
FIG. 4 depicts a cluster mapping of retail service locations in a method of service location optimization, according to one or more embodiments.

FIG. 4 depicts a user interface display of a cluster mapping 400 of retail service locations in a method of service location optimization, according to one or more embodiments. As shown in FIG. 4, each retail service location 100 may be represented by a graphical element 430 arranged within cluster mapping 400 based on, for example, weekly sales 410 and weekly transactions 420. A scale 440 may reflect the clustering of retail service locations 100. The clustering may be performed with respect to any desired selection of retail service location 100 metrics and measured data, and may be accomplished by any suitable statistical process, such as, for example, k-means clustering.

The clustering model may be implemented by machine learning module 232 depicted in FIG. 2. As discussed above, machine learning model may be trained using a dataset of past performance data for one or more retail service locations 100, such as may be stored in database 220. For example, the model may be trained using a portion of the past performance data as a training dataset and another portion as a validation dataset. For example, 70% of the past performance data may be used as a training dataset and the remaining 30% may be used as a validation dataset. The clustering model may be trained using, for example, average weekly transactions and average weekly sales for each retail service location 100. The clustering model may be, for example, an unsupervised machine learning model, and may be validated based on a silhouette score.

Within user interface display of a cluster mapping 400, the formatting and presentation of graphical element 430, such as size, highlighting, animation, etc., may indicate information about the associated retail service location 100 such as, for example, sales volume, profitability, operational status, etc. In addition, user interaction with graphical element 430, such as clicking, hovering, etc., may cause a display of detailed information about the associated retail service location 100, or may open a dashboard or other user interface, such as those discussed above with respect to user interface module 250.

An arrival rate model may make use of hourly and store-level metrics to predict an arrival rate of customers 115. The modeled customer arrival rate may be used to calculate key performance indicators for retail service location 100, such as, for example, wait time, number of customers waiting, and utilization of POS terminals 110 and 150. The model may be accomplished by any suitable statistical process, such as, for example, linear regression.

The arrival rate model may be implemented by machine learning module 232 depicted in FIG. 2. As discussed above, machine learning model may be trained using a dataset of past performance data for one or more retail service locations 100, such as may be stored in database 220. For example, the model may be trained using a portion of the past performance data as a training dataset and another portion as a validation dataset. For example, 70% of the past performance data may be used as a training dataset and the remaining 33% may be used as a validation dataset. The arrival rate may be trained using, for example, an average number of transactions in a seasonal period (a standard period, Christmas and Thanksgiving), weekdays (Monday, Tuesday, etc.), peak hours (peak and non-peak), type of POS (manned POS terminals 110, unmanned POS terminals 150, etc.) for each retail service location 100. The arrival rate model may be, for example, a supervised machine learning model, and may be validated based on a Mean Absolute Percentage Error (MAPE). In addition, a Root Mean Squared Error (RMSE) metric for may be employed for evaluation of training and validation, in place of or in combination with MAPE, for the arrival rate model. Customer arrival rates may be co-related with a number of transactions for retail service locations 100. Accordingly, transaction data may be used to estimate a customer arrival rate for any time-period for a retail service location 100.

An operational level of POS terminals 110 and 150 may be determined based on collected current or historical data, or may be specified by a user. The operational level of POS terminals 110 and 150 may be specific to each POS terminal 110 and 150 or may be distributed across POS terminals 110 and 150. However, the total operational level of POS terminals 110 and 150, in aggregate or individually, may be capped at 100%. If the specified number or operational percentage of POS terminals 110 and 150 is such that an expected wait time is above a predetermined threshold, the system may limit the number or operational percentage of POS terminals 110 and 150 to a range in which the expected wait time is below the predetermined threshold.

A service rate model may make use of hourly and store-level metrics to predict service rate capacity. That is, a service rate may be predicted based on the hourly and store-level metric data, and may be used to calculate key performance indicators for retail service location 100, such as, for example, wait time, number of customers waiting, and utilization of POS terminals 110 and 150 in combination with a modeled arrival rate of customers 115. The model may be accomplished by any suitable statistical process, such as, for example, extreme gradient boosting regression.

The service rate model may be implemented by machine learning module 232 depicted in FIG. 2. As discussed above, machine learning model may be trained using a dataset of past performance data for one or more retail service locations 100, such as may be stored in database 220. For example, the model may be trained using a portion of the past performance data as a training dataset and another portion as a validation dataset. For example, 70% of the past performance data may be used as a training dataset and the remaining 33% may be used as a validation dataset. The service rate model may be trained using, for example, a number of items per transaction, a number or percentage of operational POS terminals, an average number of transactions in a seasonal period (a standard period, Christmas and Thanksgiving), weekdays (Monday, Tuesday, etc.), peak hours (peak and non-peak), type of POS (manned POS terminals 110, unmanned POS terminals 150, etc.) for each retail service location 100. The service rate model may be, for example, a supervised machine learning model, and may be validated based on a Mean Absolute Percentage Error (MAPE). In addition, a Root Mean Squared Error (RMSE) metric for may be employed for evaluation of training and validation, in place of or in combination with MAPE, for the service rate model. A service rate capacity for retail service locations 100 may be primarily influenced by a number of items per transaction, a number or percentage of operational POS terminals, and an average number of transactions.

A total service rate may be derived from the operational level of POS terminals 110 and 150 and the service rates of POS terminals 110 and 150. Generally, the total service rate should be greater than the arrival rate of customers 115 to avoid infinite wait times for customers 115. Within the modeling process, the arrival rate of customers 115 may be capped to less than the total service rate for each time period, such as per hour.

Figure 5:
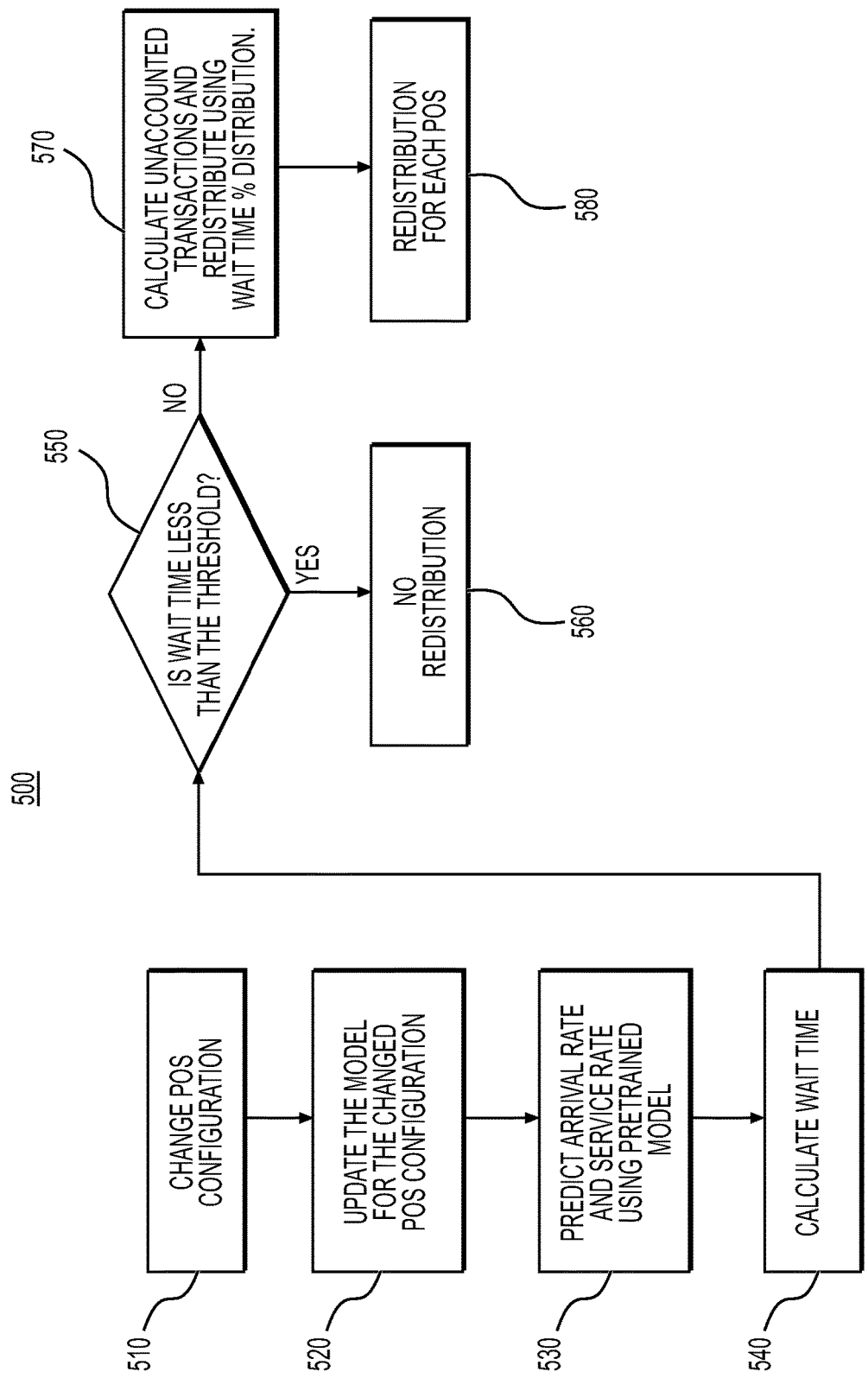
FIG. 5 depicts a flowchart of modeling customer traffic redistribution in a method of service location optimization, according to one or more embodiments.

When retail service location 100 removes one of POS terminals 110 or 150, customers 115 may look for different options to reduce their wait time. Such movement between POS terminals 110 and 150, or "traffic redistribution," may depend upon the items 125 in customer 115's basket or cart 120 and wait time for each of POS terminals 110 or 150. Based on a configuration of POS terminals 110 or 150, and a given wait time, an algorithm to predict customer traffic redistribution may identify an availability for each of POS terminals 110 or 150. The algorithm may further redistribute the traffic based on a transaction-distribution pattern of retail service location 100 and an availability of POS terminals 110 or 150 to distribute the traffic. Generally, decreasing the number of POS terminals 110 or 150 may result in a higher wait time. FIG. 5 depicts a flowchart of modeling customer traffic redistribution in a method of service location optimization, according to one or more embodiments.

As shown in FIG. 5, the prediction of customer traffic redistribution may begin by receiving, at operation 510, a configuration of POS terminals 110 or 150, such as may reflect a change in a configuration of a new retail service location 100 or a reconfiguration of an existing retail service location 100. At operation 520, the configuration of POS terminals 110 or 150 may be input into the customer traffic redistribution model. At operation 530, an arrival rate and a service rate may be predicted based on a previously trained model and the configuration of POS terminals 110 or 150. At operation 540, an average expected customer wait time may be calculated using the trained model and the configuration of POS terminals 110 or 150. At operation 550, the calculated average expected customer wait time may be compared to a predetermined threshold, such as, for example, a number of minutes or fractions of minutes. A different predetermined threshold may be used for each type of POS terminal among POS terminals 110 and 150. If the calculated average expected customer wait time is less than the predetermined threshold, then at operation 560, it may be determined that there is no customer traffic redistribution. If the calculated average expected customer wait time is greater than or equal to the predetermined threshold, then at operation 570, a number of unaccounted transactions is calculated, and a distribution of the unaccounted transactions among POS terminals 110 or 150 is determined, based on, for example, a percentage of total wait time for each of POS terminals 110 or 150. At operation 580 the modeled customer traffic redistribution may be updated to reflect the determined redistribution.

Retail Service Location Optimization Process

Through the use of the metrics and models described above, the configuration and operation of retail service location 100 may be optimized across various aspect of retail service location 100 operations, including, for example, customer wait time, as discussed below with respect to FIG. 6, an average number of customer waiting in a queue, as discussed below with respect to FIG. 7, an average utilization of POS terminals 110 and 150, as discussed below with respect to FIG. 8, and a labor cost, as discussed below with respect to FIGS. 9 and 10.

Figure 6:
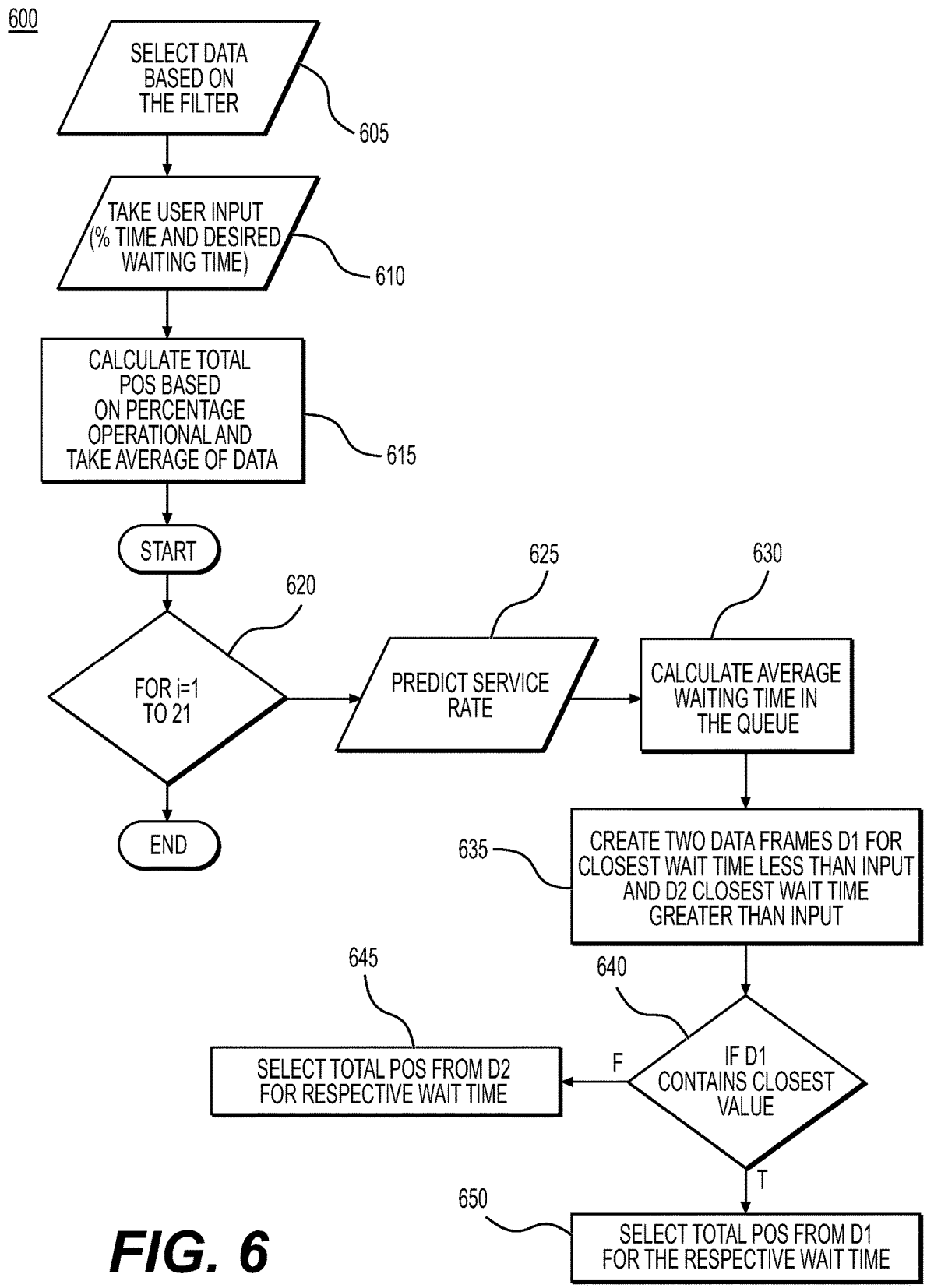
FIG. 6 depicts a flowchart of calculating an optimized wait time in a method of service location optimization, according to one or more embodiments.

FIG. 6 depicts a flowchart of calculating an optimized customer wait time in a method of service location optimization, according to one or more embodiments. As shown in FIG. 6, at operation 605, the method may select data for one or more retail locations 100 from database 220 based on the filters selected by a user. At operation 610, the method may receive optimization parameters from a user such as, for example, a target average waiting time per customer, and a percentage of customer visits that exceed the target average waiting time. The optimization parameters specified by the user may be, for example, an average value per hour. The specified parameters may be normalized such as by taking an average of the recorded data per retail location 100.

At operation 615, the method may calculate total POS terminals 110 and 150 based on a percentage of operational POS terminals 110 and 150. This calculation may be based on taking an average of operational POS terminals 110 and 150 as the operational percentage of POS terminals 110 and 150 per hour. In addition, the method may predict an arrival rate of customers, such as according to the methods discussed above. At operation 620, the method may loop through a number of operational POS terminals 110 and 150, such as from 1 to 21, to be used in a prediction of the service rate for the given number of operational POS terminals 110 and 150. The operational POS terminals 110 and 150 may be selected, for example, from the data from retail service location 100 and/or from other retail service locations 100. At operation 625, the method may calculate a predicted service rate of the operational POS terminal 110 or 150. At operation 630, the method may calculate an average waiting time in a queue of the operational POS terminal 110 or 150. Such a calculation may require that an arrival rate of customers 115 is less than product of the predicted service rate and the specified number of operational POS terminals 110 and 150. To satisfy this condition the arrival rate may be capped to be less than the service rate, as discussed above. The average waiting time in the queue may be calculated based on a calculated average number of customers waiting in the queue according to the percentage of customer visits that exceed a target average waiting time, such as may be specified by the user.

At operation 635, the method may divide the list of the operational POS terminals 110 and 150 into a first list, or data frame D1, of operational POS terminals 110 and 150 having an average wait time less than the target average waiting time per customer, and a second list, or data frame D2, of operational POS terminals 110 and 150 having an average wait time greater than the target average waiting time per customer. At operation 635, the method may match the target average waiting time per customer with the first list or second list of operational POS terminals 110 and 150 containing an operational POS terminal 110 and 150 having an average wait time closest to the target average waiting time per customer. If the first list of operational POS terminals 110 and 150 contains an operational POS terminals 110 and 150 having an average wait time closest to the target average waiting time per customer, then, at operation 650, the method may select the total operational POS terminals 110 and 150 from the first list as an optimal total POS terminals 110 and 150 for the specified conditions. Otherwise, at operation 645, the method may select the total operational POS terminals 110 and 150 from the second list as an optimal total POS terminals 110 and 150 for the specified conditions.

Figure 7:
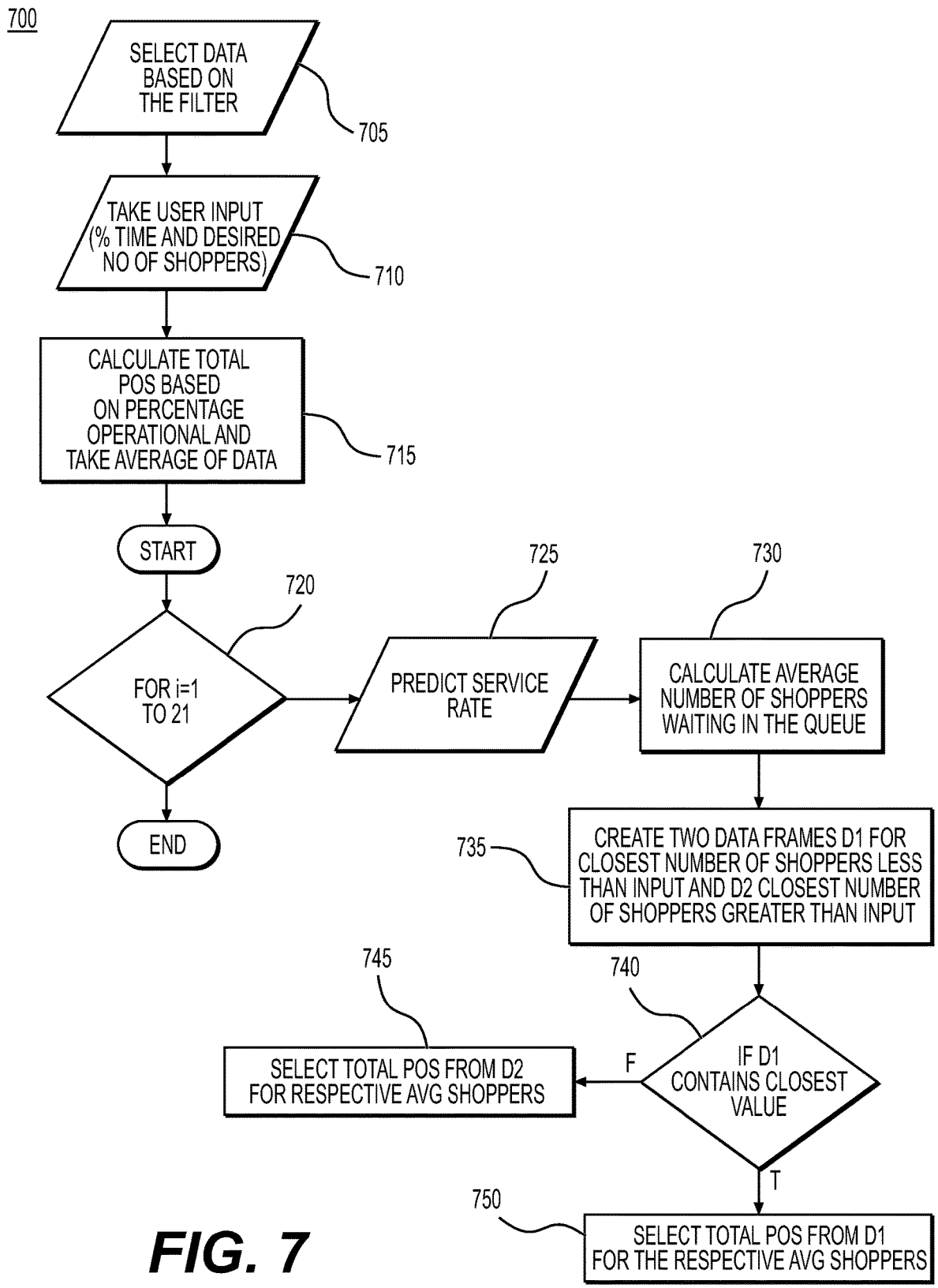
FIG. 7 depicts a flowchart of calculating an optimized average number of customers waiting in a queue in a method of service location optimization, according to one or more embodiments.

FIG. 7 depicts a flowchart of calculating an optimized average number of customers waiting in the queue in a method of service location optimization, according to one or more embodiments. As shown in FIG. 7, at operation 705, the method may select data for one or more retail locations 100 from database 220 based on the filters selected by a user. At operation 710, the method may receive optimization parameters from a user such as, for example, a target average number of customers waiting in the queue, and a percentage of time periods that exceed the target average number of customers. The optimization parameters by the user may be, for example, an average value per hour. The specified parameters may be normalized such as by taking an average of the recorded data per retail location 100. At operation 715, the method may calculate a total number POS terminals 110 and 150 based on a percentage of operational POS terminals 110 and 150. This calculation may be based on taking an average of operational POS terminals 110 and 150 as the operational percentage of POS terminals 110 and 150 per hour. In addition, the method may predict an arrival rate of customers, such as according to the methods discussed above. At operation 720, the method may loop through a number of operational POS terminals 110 and 150, such as from 1 to 21, to be used in a prediction of the service rate for the given number of operational POS terminals 110 and 150. The operational POS terminals 110 and 150 may be selected, for example, from the data from retail service location 100 and/or from other retail service locations 100. At operation 725, the method may calculate a predicted service rate of the operational POS terminal 110 or 150. At operation 730, the method may calculate an average number of customers waiting in the queue of the operational POS terminal 110 or 150. Such a calculation may require that an arrival rate of customers 115 is less than product of the predicted service rate and the specified number of operational POS terminals 110 and 150. To satisfy this condition the arrival rate may be capped to be less than the service rate, as discussed above. The average number of customers waiting in the queue may be calculated according to the percentage of time periods that exceed the target average number of customers, such as may be specified by the user. At operation 735, the method may divide the list of the operational POS terminals 110 and 150 into a first list, or data frame D1, of operational POS terminals 110 and 150 having an average number of customers less than the target average number of customers, and a second list, or data frame D2, of operational POS terminals 110 and 150 having an average number of customers greater than the target average number of customers. At operation 735, the method may match the target average number of customers with the first list or second list of operational POS terminals 110 and 150 containing an operational POS terminal 110 and 150 having an average number of customers closest to the target average number of customers. If the first list of operational POS terminals 110 and 150 contains an operational POS terminal 110 or 150 having an average number of customers closest to the target average number of customers, then, at operation 750, the method may select the total operational POS terminals 110 and 150 from the first list as an optimal total POS terminals 110 and 150 for the specified conditions. Otherwise, at operation 745, the method may select the total operational POS terminals 110 and 150 from the second list as an optimal total POS terminals 110 and 150 for the specified conditions.

Figure 8:
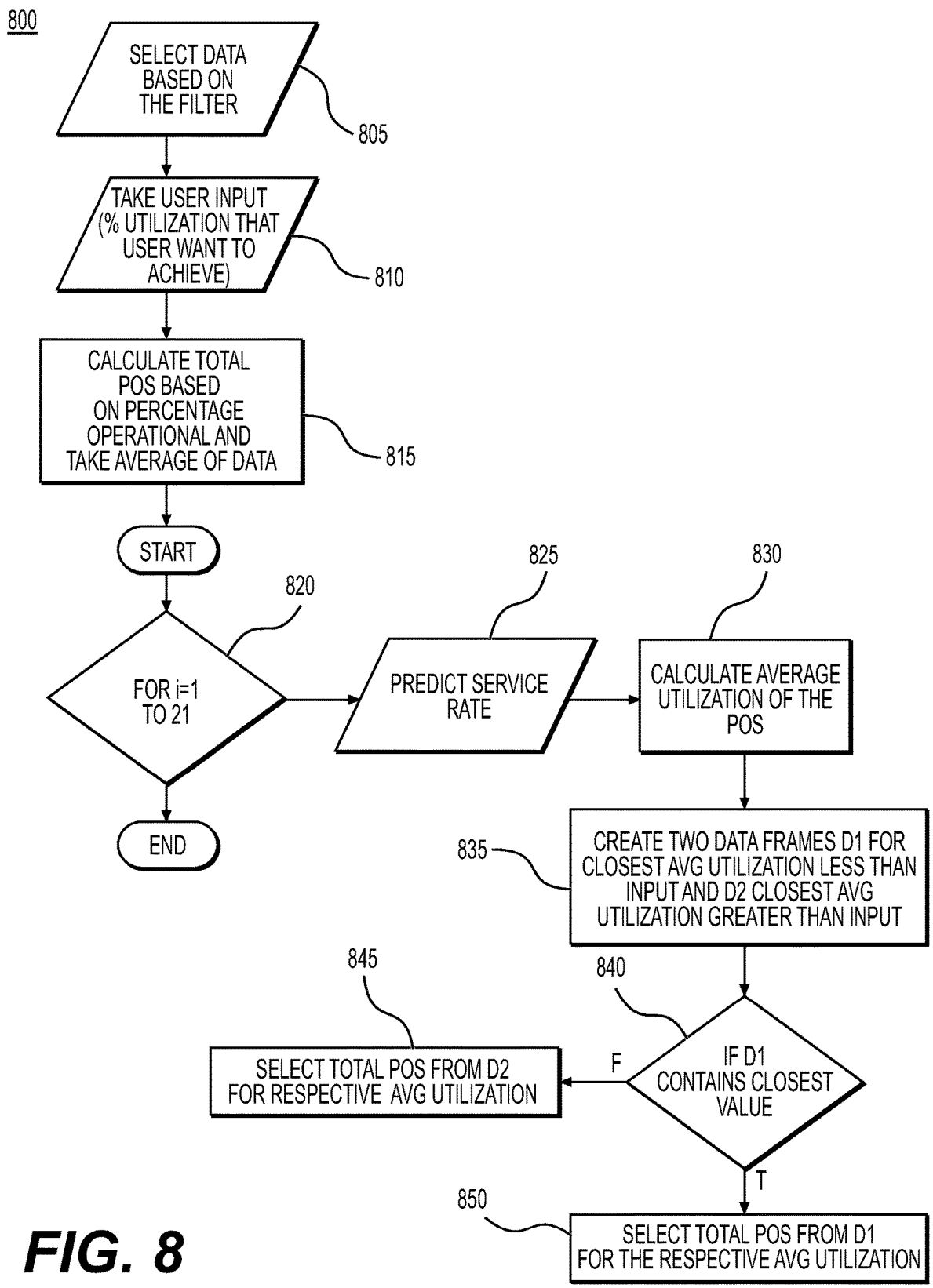
FIG. 8 depicts a flowchart of calculating an optimized average utilization of a POS terminal in a method of service location optimization, according to one or more embodiments.

FIG. 8 depicts a flowchart of calculating an optimized average utilization of POS terminals 110 and 150 in a method of service location optimization, according to one or more embodiments. As shown in FIG. 8, at operation 805, the method may select data for one or more retail locations 100 from database 220 based on the filters selected by a user. At operation 810, the method may receive optimization parameters from a user such as, for example, a target average utilization of POS terminals 110 and 150. The optimization parameters specified by the user may be, for example, an average value per hour. The specified parameters may be normalized such as by taking an average of the recorded data per retail location 100. At operation 815, the method may calculate a total number of POS terminals 110 and 150 based on a percentage of operational POS terminals 110 and 150. This calculation may be based on taking an average of operational POS terminals 110 and 150 as the operational percentage of POS terminals 110 and 150 per hour. In addition, the method may predict an arrival rate of customers, such as according to the methods discussed above. At operation 820, the method may loop through a number of operational POS terminals 110 and 150, such as from 1 to 21, to be used in a prediction of the service rate for the given number of operational POS terminals 110 and 150. The operational POS terminals 110 and 150 may be selected, for example, from the data from retail service location 100 and/or from other retail service locations 100. At operation 825, the method may calculate a predicted service rate of the operational POS terminal 110 or 150. At operation 830, the method may calculate an average utilization of the POS terminal 110 or 150. Such a calculation may require that an arrival rate of customers 115 is less than product of the predicted service rate and the specified number of operational POS terminals 110 and 150. To satisfy this condition, the arrival rate may be capped to be less than the service rate, as discussed above. At operation 835, the method may divide the list of the operational POS terminals 110 and 150 into a first list, or data frame D1, of operational POS terminals 110 and 150 having an average utilization less than the target average utilization, and a second list, or data frame D2, of operational POS terminals 110 and 150 having an average utilization greater than the target average utilization. At operation 835, the method may match the target average utilization with the first list or second list of operational POS terminals 110 and 150 containing an operational POS terminal 110 and 150 having an average utilization closest to the target average utilization. If the first list of operational POS terminals 110 and 150 contains an operational POS terminal 110 and 150 having an average utilization closest to the target average utilization, then, at operation 850, the method may select the total operational POS terminals 110 and 150 from the first list as an optimal total POS terminals 110 and 150 for the specified conditions. Otherwise, at operation 845, the method may select the total operational POS terminals 110 and 150 from the second list as an optimal total POS terminals 110 and 150 for the specified conditions.

Figure 9:
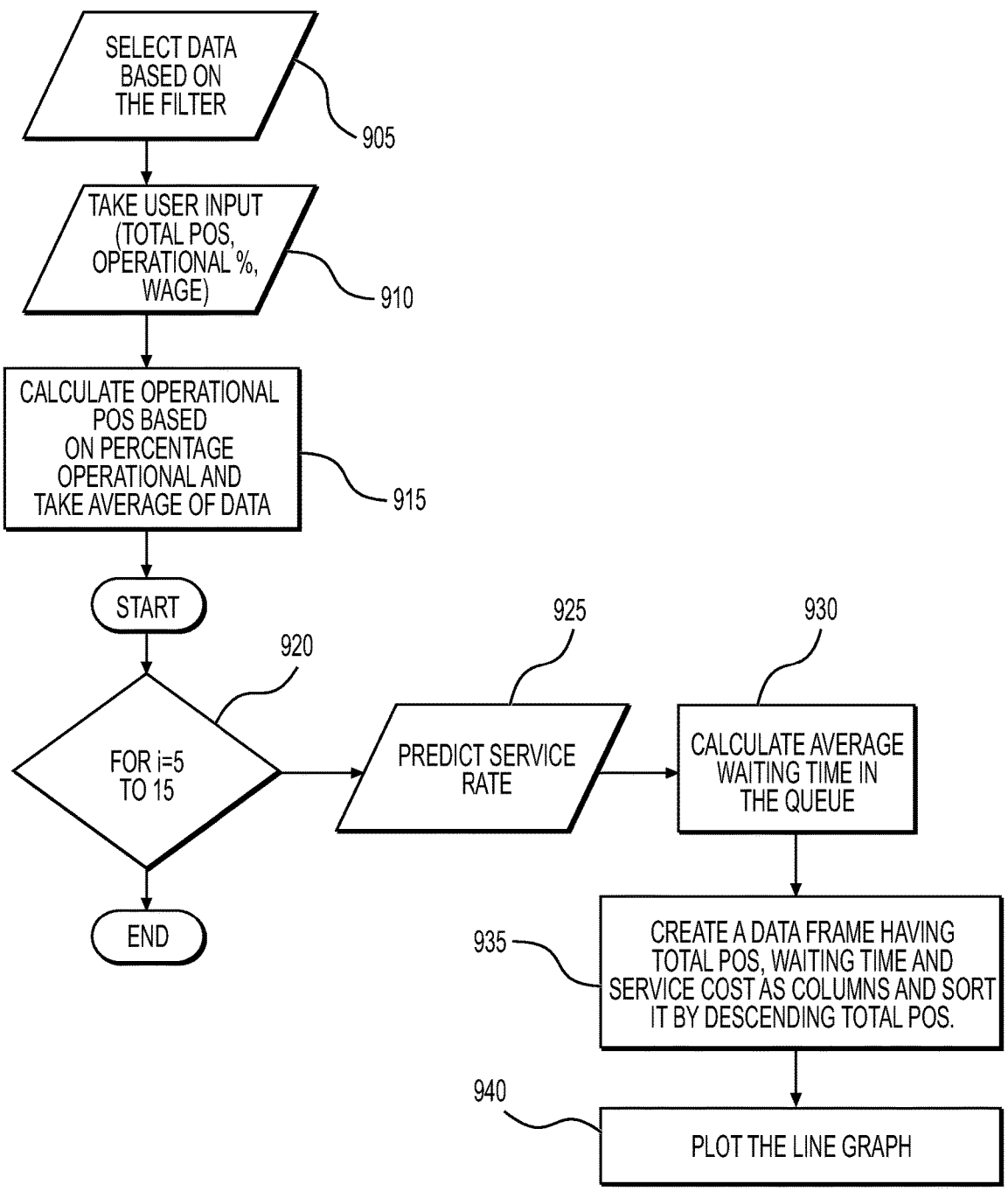
FIG. 9 depicts a flowchart of calculating an optimized labor cost in a method of service location optimization, according to one or more embodiments.

FIG. 9 depicts a flowchart of calculating an optimized labor cost in a method of service location optimization, according to one or more embodiments. As shown in FIG. 9, at operation 905, the method may select data for one or more retail service locations 100 from database 220 based on the filters selected by a user. At operation 910, the method may receive optimization parameters from a user such as, for example, a total number of POS terminals 110 and 150, an operational percentage of POS terminals 110 and 150, and an associate wage per hour. For example, the user may specify 10 total POS terminals 110 and 150, an operational percentage of 50%, and an associate wage of $12.50 per hour. At operation 915, the method may calculate a total number of POS terminals 110 and 150 based on a percentage of operational POS terminals 110 and 150. This calculation may be based on taking an average of operational POS terminals 110 and 150 as the operational percentage of POS terminals 110 and 150 per hour. In addition, the method may predict arrival rate of customers, such as according to the methods discussed above. The method may then determine a starting and ending number of POS terminals 110 and 150 to use on the calculations. For example, if the total number of operational POS terminals 110 and 150 is 10 and the percentage of operational POS terminals 110 and 150 is 50%, then the staring value may be 5 (10−(10*50%)) and the ending value may be 15 (10+(10*50%)). At operation 920, the method may loop from the starting to the ending number of operational POS terminals 110 and 150, such as from 5 to 15, to be used in a prediction of the service rate for the given number of operational POS terminals 110 and 150. The operational POS terminals 110 and 150 may be selected, for example, from the data from retail service location 100 and/or from other retail service locations 100. At operation 925, the method may calculate a predicted service rate. At operation 930, the method may calculate an average waiting time in the queue of POS terminals 110 and 150. Such a calculation may require that an arrival rate of customers 115 is less than product of the predicted service rate and the specified number of operational POS terminals 110 and 150. To satisfy this condition the arrival rate may be capped to be less than the service rate, as discussed above. At operation 935, the method may create a list having a total number of POS terminals 110 and 150, customer waiting time, and labor cost, and may sort the list by descending total POS terminals 110 and 150. At operation 935, the method may present the list in a user interface, such as by plotting a line graph.

Figure 10:
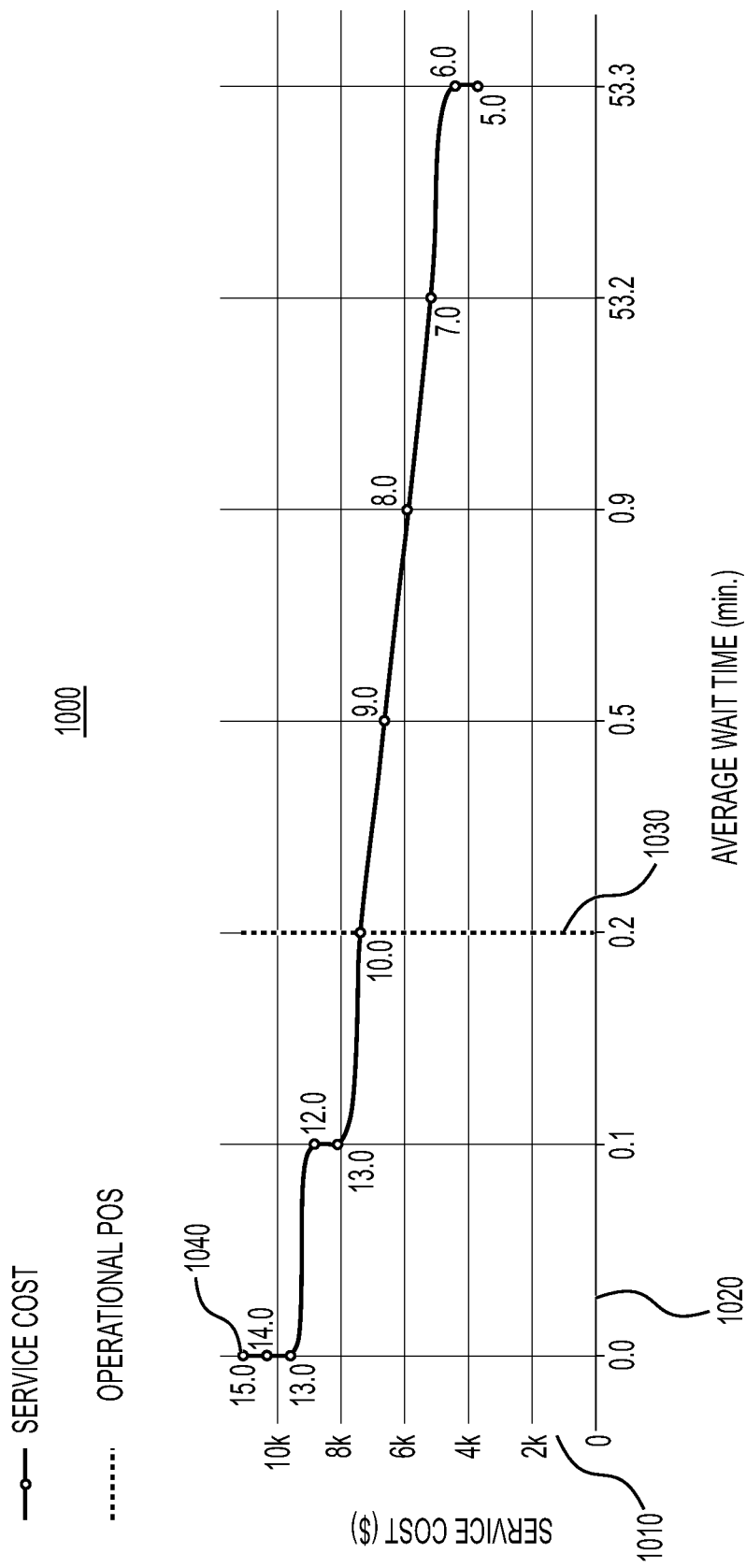
FIG. 10 depicts a graph of a calculated optimized labor cost in a method of service location optimization, according to one or more embodiments.

FIG. 10 depicts a graph 1000 of a calculated optimized labor cost in a method of service location optimization, according to one or more embodiments. For this example, the user may specify 10 total POS terminals 110 and 150, an operational percentage of 50%, and an associate wage of $12.50 per hour. As shown in FIG. 10, for each number of POS terminals 110 and 150, a data point 1040 may be graphed according to the total service cost 1010 and the average customer wait time 1030. Graph 1000 may further include a reference line 1030 indicating the user-specified number of operational POS terminals 110 and 150.

Figure 11:
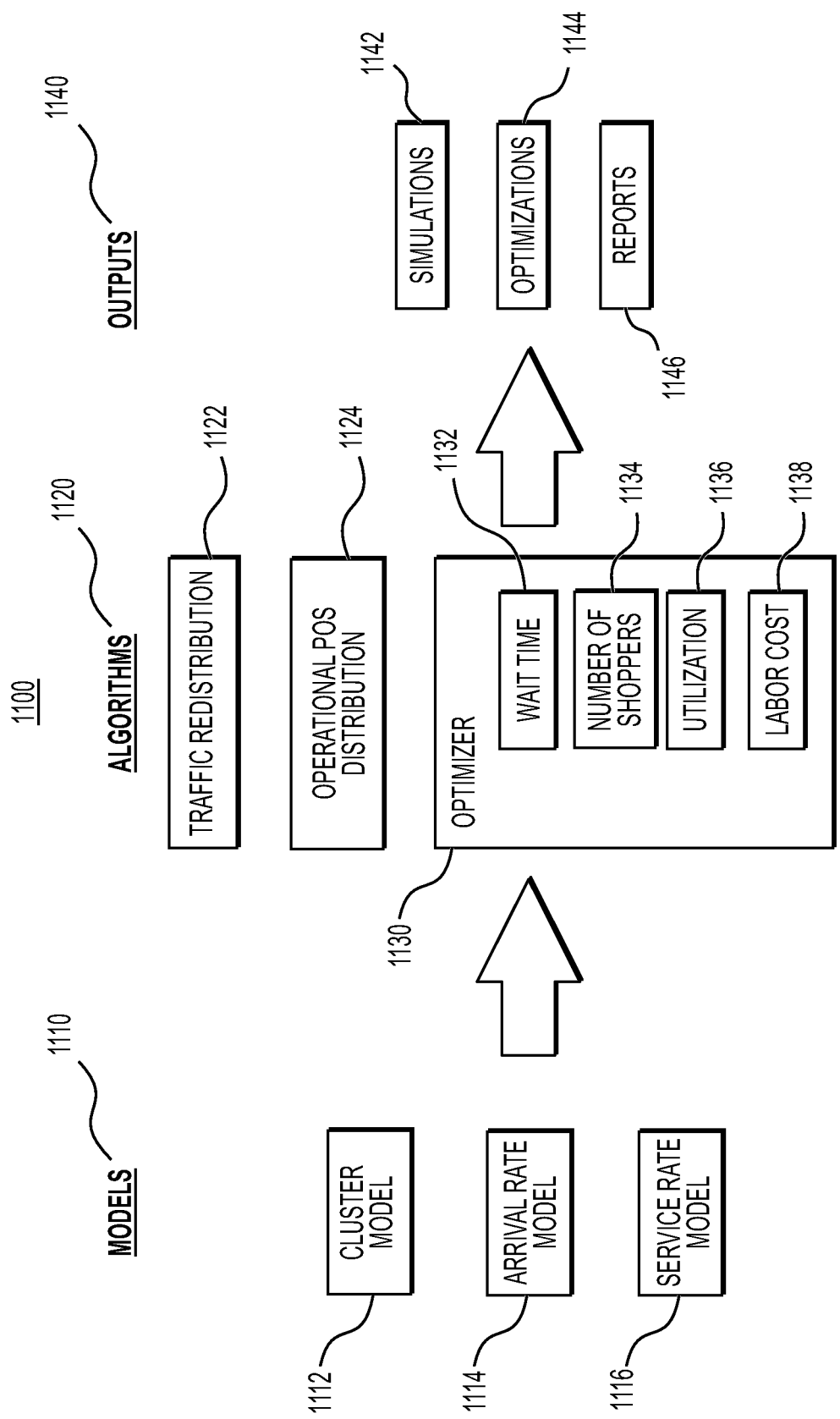
FIG. 11 depicts a process flow of a method of service location optimization, according to one or more embodiments.

FIG. 11 depicts a process flow 1100 of a method of service location optimization, according to one or more embodiments. As shown in FIG. 11, process flow 1100 may include calculation of one or more models 1110, execution of one or more algorithms 1120, and production of one or more outputs 1140. For example, the calculated models 1110 may include for example, a cluster model to place retail service location 100 in one of several clusters of similar retail service locations 100, such as the model discussed above with respect to FIG. 4, an arrival rate model to predict an arrival rate of customers 115 at retail service location 100, as discussed above, and a service rate model to predict a service rate capacity for retail service location 100, as discussed above.

In addition, the one or more algorithms 1120 executed by process flow 1100 may include, for example, an algorithm to predict customer traffic redistribution, such as the algorithm discussed above with respect to FIG. 5, an algorithm to predict an operational level of POS terminals 110 and 150, as discussed above, and one or more optimization algorithms performed by retail service location optimizer 1130. The optimization algorithms performed by retail service location optimizer 1130 may include, for example, an algorithm 1132 for calculating an optimized customer wait time, as discussed above with respect to FIG. 6, an algorithm 1134 for calculating an optimized average number of customers waiting in the queue, as discussed above with respect to FIG. 7, an algorithm 1136 for calculating an optimized average utilization of POS terminals 110 and 150, as discussed above with respect to FIG. 8, and an algorithm 1138 for calculating an optimized labor cost, as discussed above with respect to FIGS. 9 and 10.

The outputs 1140 produced may include, simulations 1142, of retail service location 100 operations and customer traffic, calculated optimizations of retail service location 100 operations, and various reports 1146, such as of store metrics and underlying data. These outputs may be, for example, produced by optimization module 235 and sent to a central office 270 or to a back office 280, or may be provided to any network-connected device, such as to a mobile device application, by way of a reporting portal 290, as discussed above with respect to FIG. 2.

Figure 12:
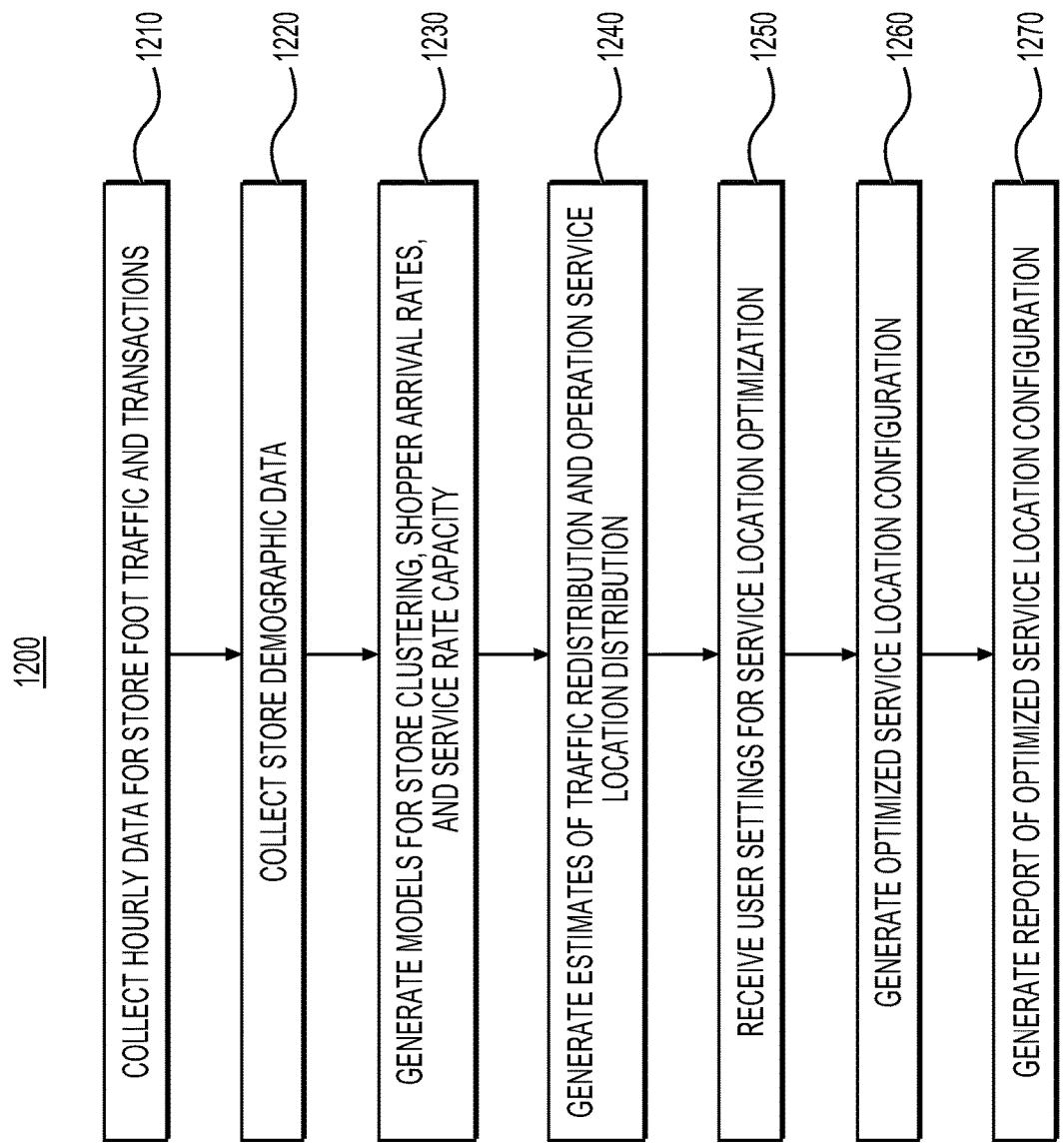
FIG. 12 depicts a flowchart of a method of service location optimization, according to one or more embodiments.

FIG. 12 depicts a flowchart of a method of service location optimization, according to one or more embodiments. As shown in FIG. 12, at operation 1210, the method may collect hourly data for store foot traffic and transactions. At operation 1220, the method may collect store demographic data. At operation 1230, the method may generate models for store clustering, customer arrival rates, and service rate capacity. At operation 1240, the method may generate estimates of traffic redistribution and operation service location distribution. At operation 1250, the method may receive user settings for service location optimization. At operation 1260, the method may generate optimized service location configuration. At operation 1270, the method may generate report of optimized service location configuration.

Optimization User Interface

Figure 14:
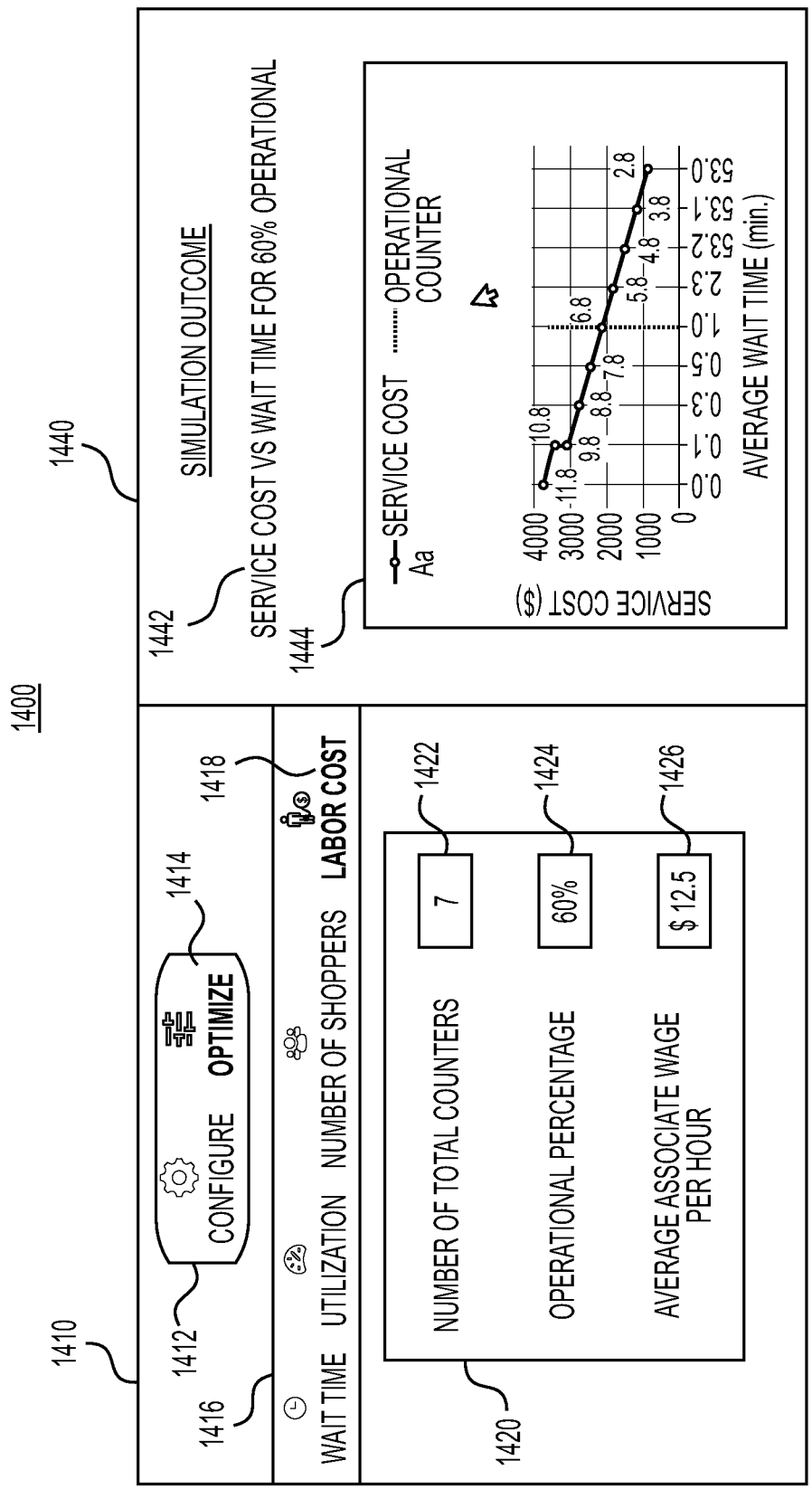
FIG. 14 depicts an exemplary user interface for service location optimization, according to one or more embodiments.
Figure 15:
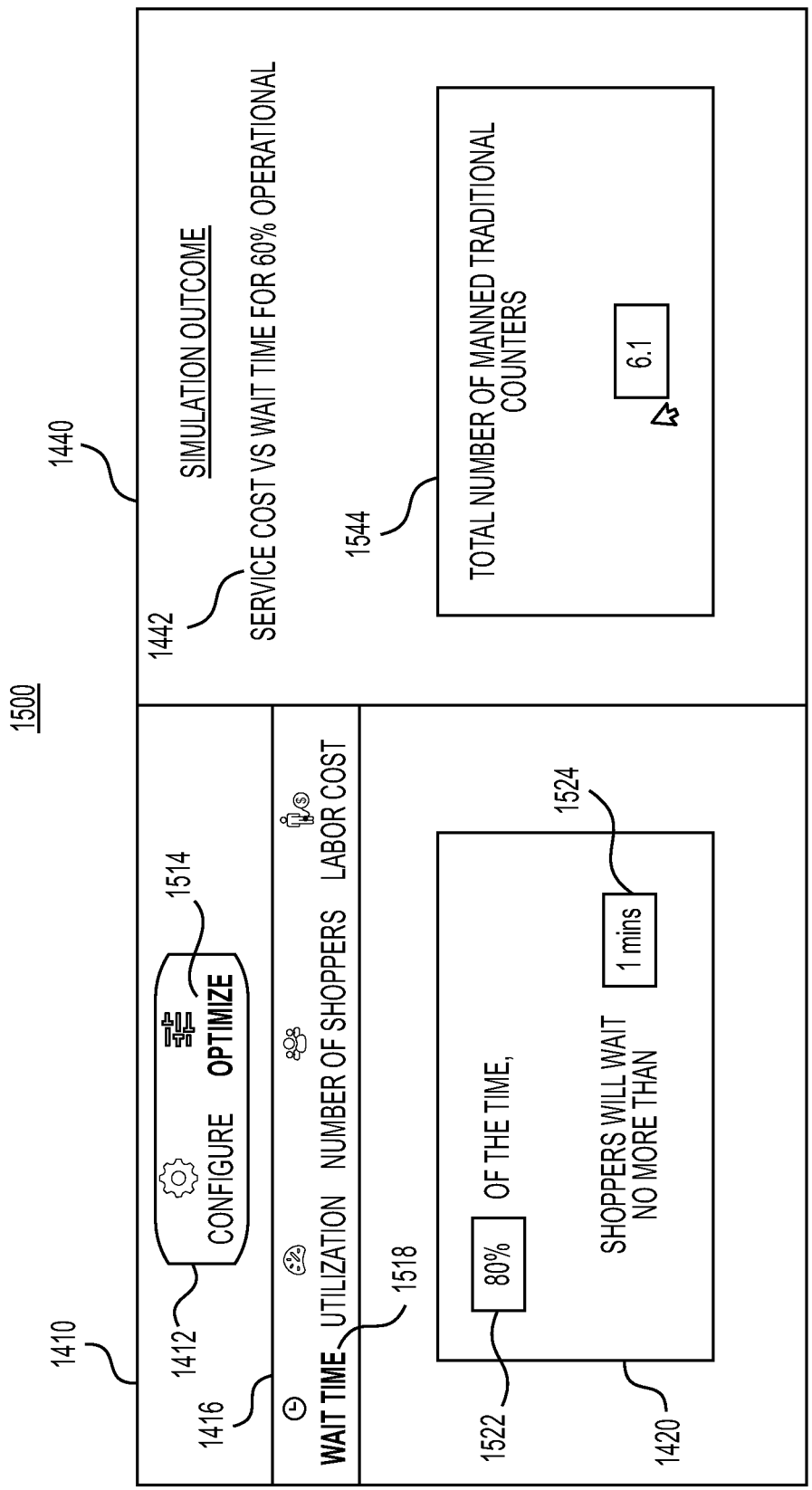
FIG. 15 depicts an exemplary user interface for service location optimization, according to one or more embodiments.

As discussed above, service location optimization, according to one or more embodiments, may include presentation of one or more user interfaces to control or report on the optimization, such as by user interface module 250 discussed above with respect to FIG. 2. FIGS. 14 and 15 depict exemplary user interfaces for service location optimization, according to one or more embodiments.

As shown in FIGS. 14 and 15, a user interfaces for service location optimization 1400 and 1500 may include a parameter pane 1410 and a results pane 1440. Parameter pane 1410 may include a function selection control 1412 for the user to select whether to perform customization operations or optimization operations. As shown in FIGS. 14 and 15, the user has selected an optimization function 1414. Based on the section of an optimization function 1414, parameter pane 1410 may display additional user interfaces to control the optimization.

Upon the selection of an optimization function 1414, parameter pane 1410 may further include an operational characteristic selection control 1416 for the user to select an operational characteristic of a retail service location for optimization. The operational characteristics of a retail service location may include, for example, an average waiting time of a customer in a queue of a POS terminal, an average number of customers waiting in a queue of a POS terminal, and average utilization of a POS terminal, and an average service cost of a POS terminal. Depending on the selection of operational characteristic, parameter pane 1410 may further display one or more parameters 1420 for controlling the optimization. As shown in FIG. 14, the user may select average service cost 1418 as the operational characteristic, and the displayed parameters 1420 may include a total number of POS terminals 1422, an operation percentage of the POS terminals 1424, and an average associate wage 1426. As shown in FIG. 15, the user may select an average waiting time of a customer in a queue of a POS terminal 1518 as the operational characteristic, and the displayed parameters 1420 may include a reference average performance metric of the target POS terminal, such as average wait time 1524, and a target percentage time 1522 that the reference average performance metric of the target POS terminal is met.

Upon completion of the requested optimization, results pane 1440 may display results of the requested optimization. For example, results pane 1440 may include a textual description 1442 of the requested optimization, such as "service cost versus wait time." In addition, results pane 1440 may include a detailed result of the requested optimization. For example, as shown in FIG. 14, a graphic 1444, such as of wait time versus service cost, may be displayed. Alternatively, as shown in FIG. 15, a number 1544 of POS terminals required to meet the specified reference average performance metric may be displayed.

Results pane 1440 may be updated automatically each time the user updates the settings in operational characteristic selection control 1416 or parameters 1420, thus allowing for quick and intuitive exploration of optimization parameters for a retail service location 100.

Computing Device

FIG. 13 is a simplified functional block diagram of a computer 1300 that may be configured as a device for executing the environments and/or the methods of FIGS. 1-12, according to exemplary embodiments of the present disclosure. For example, device 1300 may include a central processing unit (CPU) 1320. CPU 1320 may be any type of processor device including, for example, any type of special purpose or a general-purpose microprocessor device. As will be appreciated by persons skilled in the relevant art, CPU 1320 also may be a single processor in a multi-core/multi-processor system, such system operating alone, or in a cluster of computing devices operating in a cluster or server farm. CPU 1320 may be connected to a data communication infrastructure 1310, for example, a bus, message queue, network, or multi-core message-passing scheme.

Device 1300 also may include a main memory 1340, for example, random access memory (RAM), and also may include a secondary memory 1330. Secondary memory 1330, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1330 may include other similar means for allowing computer programs or other instructions to be loaded into device 1300. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1300.

Device 1300 also may include a communications interface ("COM") 1360. Communications interface 1360 allows software and data to be transferred between device 1300 and external devices. Communications interface 1360 may include a modem, a network interface (such as an Ethernet card), a communications port, a PCMCIA slot and card, or the like. Software and data transferred via communications interface 1360 may be in the form of signals, which may be electronic, electromagnetic, optical, or other signals capable of being received by communications interface 1360. These signals may be provided to communications interface 1360 via a communications path of device 1300, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 1300 also may include input and output ports 1350 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the general description and the detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

As used herein, a term such as "user" or the like generally encompasses a pet parent and/or pet parents. A term such as "pet" or the like generally encompasses a user's pet, where the term may encompass multiple pets. Also, the term "pet" refers to any type of animal, including domesticated animals. A term such as "provider" or the like generally encompasses a pet care business It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for optimizing an operational characteristic of a service location, the method comprising:
    receiving past performance data for one or more operational characteristics for one or more reference service locations;
    wherein the past performance data comprises customer transactions from a plurality of operational POS terminals;
    receiving, from a user, a target value for an additional operational characteristic of a target service location;
    receiving operational data for one or more operational point of sale (POS) terminals for the target service location and/or from the reference service locations;
    training a machine learning model using the received past performance data and the received operational data for the operational POS terminals;
    calculating a predicted service rate or a predicted arrival rate using the trained machine learning model;
    redistributing one or more customer transactions among the operational POS terminals based on the predicted service rate or the predicted arrival rate;
    calculating an average value of the additional operational characteristic for each of the operational POS terminals following the redistributing;
    determining an average POS terminal as a POS terminal among the one or more operational POS terminals with the calculated average value of the additional operational characteristic that matches the target value for the additional operational characteristic;
    selecting the average POS terminal as a representative POS terminal;
    setting operational characteristics of a target POS terminal of the target service location to be equal to the operational characteristics of the representative POS terminal; and
    receiving, from the target POS terminal, updated operational performance data representing completed transactions after the setting operational characteristics for the one or more operational characteristics; and
    retraining the machine learning model using the received operation characteristics and the received updated performance data for the operational POS terminals.

2. The computer-implemented method of claim 1, wherein the additional operational characteristic is one of an average waiting time of a customer in a queue of the target POS terminal, an average number of customers waiting in a queue of the target POS terminal, and average utilization of the target POS terminal, and an average service cost of the target POS terminal.

3. The computer-implemented method of claim 1, wherein selecting a POS terminal among the one or more operational POS terminals further comprises:
    dividing the one or more operational POS terminals into a first list of operational POS terminals having a value of the additional operational characteristic less than the target value for the additional operational characteristic and a second list of operational POS terminals having a value of the additional operational characteristic greater than or equal to the target value for the additional operational characteristic; and
    selecting, as a representative list of POS terminals, one of the first list and the second list containing an operational POS terminal with a calculated average value of the additional operational characteristic that matches the target value for the additional operational characteristic.

4. The computer-implemented method of claim 1, wherein the average value of the additional operational characteristic for each of the operational POS terminals is calculated using video data collected from the service location.

5. The computer-implemented method of claim 1, wherein the one or more operational characteristics of the service location include one or more of a number of manned point of sale (POS) terminals present at the service location, a number unmanned POS terminals present at the service location, a schedule of operation of the manned POS terminals and the unmanned POS terminals, an arrival rate of customers at the service location, and an average number of service items selected by the customers at the service location.

6. The computer-implemented method of claim 1, the method further comprising:
    receiving, from the user, one or more parameters controlling an optimization of the additional operational characteristic of the target service location,
    wherein the average value of the additional operational characteristic for each of the operational POS terminals is calculated based on the one or more parameters.

7. The computer-implemented method of claim 6, wherein the one or more parameters controlling the optimization include one or more of a number of total point of sale (POS) terminals, an operation percentage of the POS terminals, an average associate wage per hour, a reference average performance metric of a target POS terminal, and a target percentage time that the reference average performance metric of the target POS terminal is met.

8. A system for optimizing an operational characteristic of a service location, the system comprising:
    a data storage device storing instructions for optimizing an operational characteristic of a service location in an electronic storage medium; and
    a processor configured to execute the instructions to perform a method including:
    receiving past performance data for one or more operational characteristics for one or more reference service locations;
    wherein the past performance data comprises customer transactions from a plurality of operational POS terminals;
    receiving, from a user, a target value for an additional operational characteristic of a target service location;
    receiving operational data for one or more operational point of sale (POS) terminals for the target service location and/or from the reference service locations;

training a machine learning model using the received past performance data and the received operational data for the operational POS terminals;

calculating a predicted service rate or a predicted arrival rate using the trained machine learning model;

redistributing one or more customer transactions among the operational POS terminals based on the predicted service rate or the predicted arrival rate;

calculating an average value of the additional operational characteristic for each of the operational POS terminals following the redistributing;

determining an average POS terminal as a POS terminal among the one or more operational POS terminals with the calculated average value of the additional operational characteristic that matches the target value for the additional operational characteristic;

selecting the average POS terminal as a representative POS terminal; setting operational characteristics of a target POS terminal of the target service location to be equal to the operational characteristics of the representative POS terminal;

receiving, from the target POS terminal, updated operational performance data representing completed transactions after the setting operational characteristics for the one or more operational characteristics; and retraining the machine learning model using the received operation characteristics and the received updated performance data for the operational POS terminals.

9. The system of claim 8, wherein the additional operational characteristic is one of an average waiting time of a customer in a queue of the target POS terminal, an average number of customers waiting in a queue of the target POS terminal, and average utilization of the target POS terminal, and an average service cost of the target POS terminal.

10. The system of claim 8, wherein selecting a POS terminal among the one or more operational POS terminals further comprises:

dividing the one or more operational POS terminals into a first list of operational POS terminals having a value of the additional operational characteristic less than the target value for the additional operational characteristic and a second list of operational POS terminals having a value of the additional operational characteristic greater than or equal to the target value for the additional operational characteristic; and selecting, as a representative list of POS terminals, one of the first list and the second list containing an operational POS terminal with a calculated average value of the additional operational characteristic that matches the target value for the additional operational characteristic.

11. The system of claim 8, wherein the average value of the additional operational characteristic for each of the operational POS terminals is calculated using video data collected from the service location.

12. The system of claim 8, wherein the one or more operational characteristics of the service location include one or more of a number of manned point of sale (POS) terminals present at the service location, a number unmanned POS terminals present at the service location, a schedule of operation of the manned POS terminals and the unmanned POS terminals, an arrival rate of customers at the service location, and an average number of service items selected by the customers at the service location.

13. The system of claim 8, wherein the system is further configured for:

receiving, from the user, one or more parameters controlling an optimization of the additional operational characteristic of the target service location, wherein the average value of the additional operational characteristic for each of the operational POS terminals is calculated based on the one or more parameters.

14. The system of claim 13, wherein the one or more parameters controlling the optimization include one or more of a number of total point of sale (POS) terminals, an operation percentage of the POS terminals, an average associate wage per hour, a reference average performance metric of a target POS terminal, and a target percentage time that the reference average performance metric of the target POS terminal is met.

15. A non-transitory machine-readable medium storing instructions that, when executed by a computing system, causes the computing system to perform a method for optimizing an operational characteristic of a service location, the method including:

receiving past performance data for one or more operational characteristics for one or more reference service locations;

wherein the past performance data comprises customer transactions from a plurality of operational POS terminals;

receiving, from a user, a target value for an additional operational characteristic of a target service location;

receiving operational data for one or more operational point of sale (POS) terminals for the target service location and/or from the reference service locations;

training a machine learning model using the received past performance data and the received operational data for the operational POS terminals;

calculating a predicted service rate or a predicted arrival rate using the trained machine learning model;

redistributing one or more customer transactions among the operational POS terminals based on the predicted service rate or the predicted arrival rate;

calculating an average value of the additional operational characteristic for each of the operational POS terminals following the redistributing;

determining an average POS terminal as a POS terminal among the one or more operational POS terminals with the calculated average value of the additional operational characteristic that matches the target value for the additional operational characteristic;

selecting the average POS terminal as a representative POS terminal;

setting operational characteristics of a target POS terminal of the target service location to be equal to the operational characteristics of the representative POS terminal; and receiving, from the target POS terminal, updated operational performance data representing completed transactions after the setting operational characteristics for the one or more operational characteristics; and retraining the machine learning model using the received operation characteristics and the received updated performance data for the operational POS terminals.

16. The non-transitory machine-readable medium of claim 15, wherein the additional operational characteristic is one of an average waiting time of a customer in a queue of the target POS terminal, an average number of customers waiting in a queue of the target POS terminal, and average utilization of the target POS terminal, and an average service cost of the target POS terminal.

17. The non-transitory machine-readable medium of claim 15, wherein selecting a POS terminal among the one or more operational POS terminals further comprises:
dividing the one or more operational POS terminals into a first list of operational POS terminals having a value of the additional operational characteristic less than the target value for the additional operational characteristic and a second list of operational POS terminals having a value of the additional operational characteristic greater than or equal to the target value for the additional operational characteristic; and
selecting, as a representative list of POS terminals, one of the first list and the second list containing an operational POS terminal with a calculated average value of the additional operational characteristic that matches the target value for the additional operational characteristic.

18. The non-transitory machine-readable medium of claim 15, wherein the average value of the additional operational characteristic for each of the operational POS terminals is calculated using video data collected from the service location.

19. The non-transitory machine-readable medium of claim 15, wherein the one or more operational characteristics of the service location include one or more of a number of manned point of sale (POS) terminals present at the service location, a number unmanned POS terminals present at the service location, a schedule of operation of the manned POS terminals and the unmanned POS terminals, an arrival rate of customers at the service location, and an average number of service items selected by the customers at the service location.

20. The non-transitory machine-readable medium of claim 15, the method further comprising:
receiving, from the user, one or more parameters controlling an optimization of the additional operational characteristic of the target service location,
wherein the average value of the additional operational characteristic for each of the operational POS terminals is calculated based on the one or more parameters.

* * * * *